United States Patent [19]
Sasagaki et al.

[11] Patent Number: 5,541,707
[45] Date of Patent: Jul. 30, 1996

[54] CAMERA INPUT AND DISPLAY DEVICE WITH TIMER AND METHOD

[75] Inventors: Nobuaki Sasagaki; Takashi Saegusa, both of Kanagawa-ken, Japan

[73] Assignee: Nikon Corporation, Tokyo, Japan

[21] Appl. No.: 377,838

[22] Filed: Jan. 25, 1995

[30] Foreign Application Priority Data

Feb. 4, 1994 [JP] Japan .................................. 6-032947

[51] Int. Cl.⁶ .................................................. G03B 17/18
[52] U.S. Cl. ......................................................... 354/474
[58] Field of Search ................................... 354/471, 474, 354/475, 484, 289.12, 289.1

[56] References Cited

U.S. PATENT DOCUMENTS

| | | | |
|---|---|---|---|
| 5,191,373 | 3/1993 | Nakano | 354/474 |
| 5,218,399 | 6/1993 | Izumi et al. | 354/471 |
| 5,249,014 | 9/1993 | Kikukawa | 354/289.12 X |

FOREIGN PATENT DOCUMENTS

| | | |
|---|---|---|
| 4-81731 | 3/1992 | Japan . |
| 4-81732 | 3/1992 | Japan . |
| 4-81733 | 3/1992 | Japan . |
| 4-81734 | 3/1992 | Japan . |

*Primary Examiner*—W. B. Perkey
*Attorney, Agent, or Firm*—Oliff & Berridge

[57] ABSTRACT

A camera input and display device and method generates displays on a dot matrix display device having a plurality of display blocks which display a plurality of display-screens. The display-screens correspond to either a first display or a second display. An input device inputs data in accordance with each display-screen. A control unit is coupled to the display device and the input device. The control unit sets a specified timer value for each display-screen. The control unit stops receiving data from the input device when a timer generates a time-out signal based on the specified timer value. The specified timer value is set for a longer time for the first display than for the second display.

28 Claims, 22 Drawing Sheets

|   | 00 | 10 | 20 | 30 | 40 | 50 | 60 | 70 | 80 | 90 | A0 | B0 | C0 | D0 | E0 | F0 |
|---|---|---|---|---|---|---|---|---|---|---|---|---|---|---|---|---|
| 0 | 0 | .0 |   | P | 0 | p | . |   | ☷ | P | ⇦ | ☷ | ♌ | ⏻ | ⚠ |   |
| 1 | 1 | .1 | A | Q | 1 | q | , |   | ☷ | P | ⇦ | ☷ | ♌ | ⏻ | ⚠ |   |
| 2 | 2 | .2 | B | R | 2 | r | ' |   | ▲ | S | ⇨ | ♛ | ↯ | ↺ | ? |   |
| 3 | 3 | .3 | C | S | 3 | s | " |   | ▲ | S | ⇨ | ♛ | ↯ | ↺ | ? |   |
| 4 | 4 | .4 | D | T | 4 | t | ♦ |   | ⚡ | A | ▣ | — | ☏ | ⊟ |   |   |
| 5 | 5 | .5 | E | U | 5 | u | - |   | ⚡ | A | ▣ | — | ☏ | ⊟ |   |   |
| 6 | 6 | .6 | F | V | 6 | v | ± |   | ✿ | M | ▣ | ⊥ | ♞ | ⊟ |   |   |
| 7 | 7 | .7 | G | W | 7 | w | ✱ |   | ✿ | M | ▣ | ⊥ | ♞ | ⊟ |   |   |
| 8 | 8 | .8 | H | X | 8 | x | ‹ |   | ↙ | ▣ | ½ | ♠ | ☂ | ▬ |   |   |
| 9 | 9 | .9 | I | Y | 9 | y | › |   | ↙ | ▣ | ½ | ♠ | ☂ | ▬ |   |   |
| A | 0 | 1. | J | Z | 0 | z | = |   | ⚘ | ▣ | ◉ | ℤ | ⊙ |   |   |   |
| B |   |   | K |   | k |   | : |   | ⚘ | ▣ | ◉ | ℤ | ⊙ |   |   |   |
| C |   |   | L |   | l |   | / |   | 日 | 151 | S | 🏠 | ⁂ | Err |   |   |
| D |   |   | M |   | m |   | ? |   | 日 | 151 | S | 🏠 | ⁂ | Err |   |   |
| E |   |   | N |   | n |   | ! |   | 日 | ▨ | C | 🏠 | AF | Υ |   | ▨ |
| F |   |   | O |   | o |   | ‼ |   | 日 | ▨ | C | 🏠 | AF | Υ |   | ▨ |

FIG.7

CAMERA INPUT AND DISPLAY DEVICE WITH TIMER AND METHOD

This application is directed to subject matter that is related to subject matter in U.S. patent application Ser. Nos. 08/378,351 entitled "A Display System for a Camera," 08/377,604, now U.S. Pat. No. 5,500,711 entitled "Camera Equipped With Warning Function and Method," 08/377,839 entitled "Camera for Selectively Inputting Operating Parameters and Method," 08/377,840 entitled "Camera With Film Sensitivity Setting Function and Method," 08/377,836 entitled "Camera Display System and Method," 08/378,449 entitled "Camera and Method for Assuring Photography With Selected Parameter," and 08/377,825 entitled "Camera With Simplified Parameter Selection and Dual Mode Operation and Method of Operation", filed simultaneously herewith by the same inventors, which are all hereby incorporated by reference.

BACKGROUND OF THE INVENTION

1. Field of the Invention

This invention relates to a camera in which specific functions can be performed by selecting a mode and selecting a function. In particular, more time is allowed to select the mode than to set the parameters of the selected mode.

2. Description of Related Art

In recent years, computers are enabling cameras to perform numerous functions such as automatic focusing adjustment (AF) and automatic exposure (AE). Film sensitivity setting, film quantity detection, and camera deflection warnings are additional monitoring functions that are under development.

As these functions are realized, it is necessary to enter and display the data associated with the operation of these functions, for example, the automatic exposure and the automatic focus parameters, and the display of the various monitored data. Accordingly, recent cameras are equipped with display devices such as liquid crystal displays (LCD).

A conventional camera display device, as described in Japanese Laid-Open Patent Application No. 3-42141, uses a dot matrix LCD mounted on the camera's main body to display picture taking information. The dot matrix LCD is divided into a plurality of display areas. Each display area displays a corresponding sub-title. The plurality of display areas are combinable into a total display capable of displaying detailed data.

A sub-title selection device is provided. The sub-title selection device allows the photographer to select one of several sub-titles that are displayed by the dot matrix LCD. When one of the sub-titles is selected, a screen-switch-over device displays the data related to the selected sub-title on the dot matrix LCD.

The photographer selects one of the displayed subtitles by operating a switch until the desired sub-title is displayed in one of the display areas. When the desired sub-title is displayed, the sub-title is selected by operating a switch that corresponds to the display area displaying the sub-title information. The screen-switchover device then displays the data related to the subtitle.

The conventional data display and selection device described above, however, does not provide a clear relationship between the operational switch and the display. The photographer is required to visually verify the sub-title information displayed while operating the switch until the desired sub-title is displayed. In addition, the sub-title selection can be made only when the desired sub-title is displayed. Further, the operation sequence must be repeated each time the photographer displays or enters picture taking information. Thus, the selection operation is complicated and inconvenient even for simple operations. When complex operations are needed, a photographer unfamiliar with the camera cannot achieve full use of the camera functions without great difficulty.

In addition to the complexity and inconvenience of the sub-title selection process, the camera limits the amount of time that the photographer has to make a response. After the camera completes one step of the selection process, it waits for a response from the photographer. When the photographer responds, the camera proceeds to the next step of a program procedure. If the photographer fails to respond, the camera either continues to wait for a response, which undesirably wastes energy, or assumes that the photographer does not desire to continue the process and turns itself OFF after a specified period of time to save energy. However, if the specified period of time is set to be too short, the camera will turn itself OFF before the photographer has completed the selection process. Consequently, the photographer may be forced to repeat the power ON process. A photographer that is unfamiliar with the sub-title selection process will often be "timed-out" causing great inconvenience. This inconvenience can be removed by setting the specified period of time to be longer, however, if a longer response time is allowed, energy is unnecessarily wasted.

SUMMARY OF THE INVENTION

This invention provides a camera that displays information that can be clearly understood and allows input data to be easily entered.

This invention also provides a camera that sets the time limit for entering data based on the camera mode. The time limit is set so that even photographers unfamiliar with the camera have enough time to perform the desired operations without an unnecessary waste of energy.

This invention also provides a method for displaying and inputting data for the camera. The method includes displaying a display-screen, setting a specified timer value for a timer, inputting data through the input device and receiving data from the input device as long as the timer does not time-out.

The camera includes a display device having a plurality of display blocks displaying a plurality of display-screens. Each of the plurality of display-screens is one of a first display and a second display. An input device inputs data in accordance with each of the plurality of display-screens displayed by the display devices. A control unit is coupled to the display device and the input device. The control unit sets a specified timer value for each of the plurality of display-screens that are displayed by the display device. The control unit stops receiving data from the input device when a timer generates a time-out signal based on the specified timer value.

The input device is provided for camera mode selection or picture taking parameter setting. A control unit coupled to the display device and the input device controls the camera to display a first display for selecting camera modes and a second display for setting parameters and data elements. The control unit receives outputs from the input device. The output of the input device indicates which camera mode was selected as well as parameter values entered in connection with the second display.

The control unit also includes the timer which may be set to expire at specified times. The display screens of the first and second displays are maintained until the timer expires. When the timer expires, the control unit turns the camera power source to stand-by which also turns OFF the display device. The specified time for the first display is longer than the specified time for the second display so that enough time is provided for the photographer to choose a camera mode selection without unnecessarily wasting power.

The input device includes a plurality of switches. The plurality of switches are placed close to the plurality of display blocks. Each switch correspond to a unique display block. The control unit associates each switch with a unique one of the plurality of the display blocks so that each switch selects one camera mode.

The input device includes a menu switch. The control unit receives an output of the menu switch when the display blocks display at least one second display and performs a process that returns the display to the first display. Each of the at least one second display corresponds to one of the at least one camera mode.

The camera further includes an input mode switch controlled by the control unit. The input mode switch selects at least a first mode and a second mode. During the first mode, the control unit displays only data that corresponds to the selected camera mode. During the second mode, the control unit displays data corresponding to any camera mode.

BRIEF DESCRIPTION OF THE DRAWINGS

The invention will be described in conjunction with the accompanying drawings in which like reference numerals designate like elements and wherein:

FIG. 4b is a diagram of a single display block of the display panel structure of FIG. 4a;

FIGS. 5a–5d are diagrams of numeric patterns that can be displayed by the display panel of FIG. 4a;

FIGS. 6a and 6b are diagrams of icons that can be displayed on the display panel of FIG. 4a;

FIG. 7 is a chart of character patterns that are stored in a pattern generator of the liquid crystal display driver of FIG. 3;

FIG. 15 is a flow chart of a display routine that controls the display panel of FIG. 4a;

DETAILED DESCRIPTION OF PREFERRED EMBODIMENTS

Figure 1:
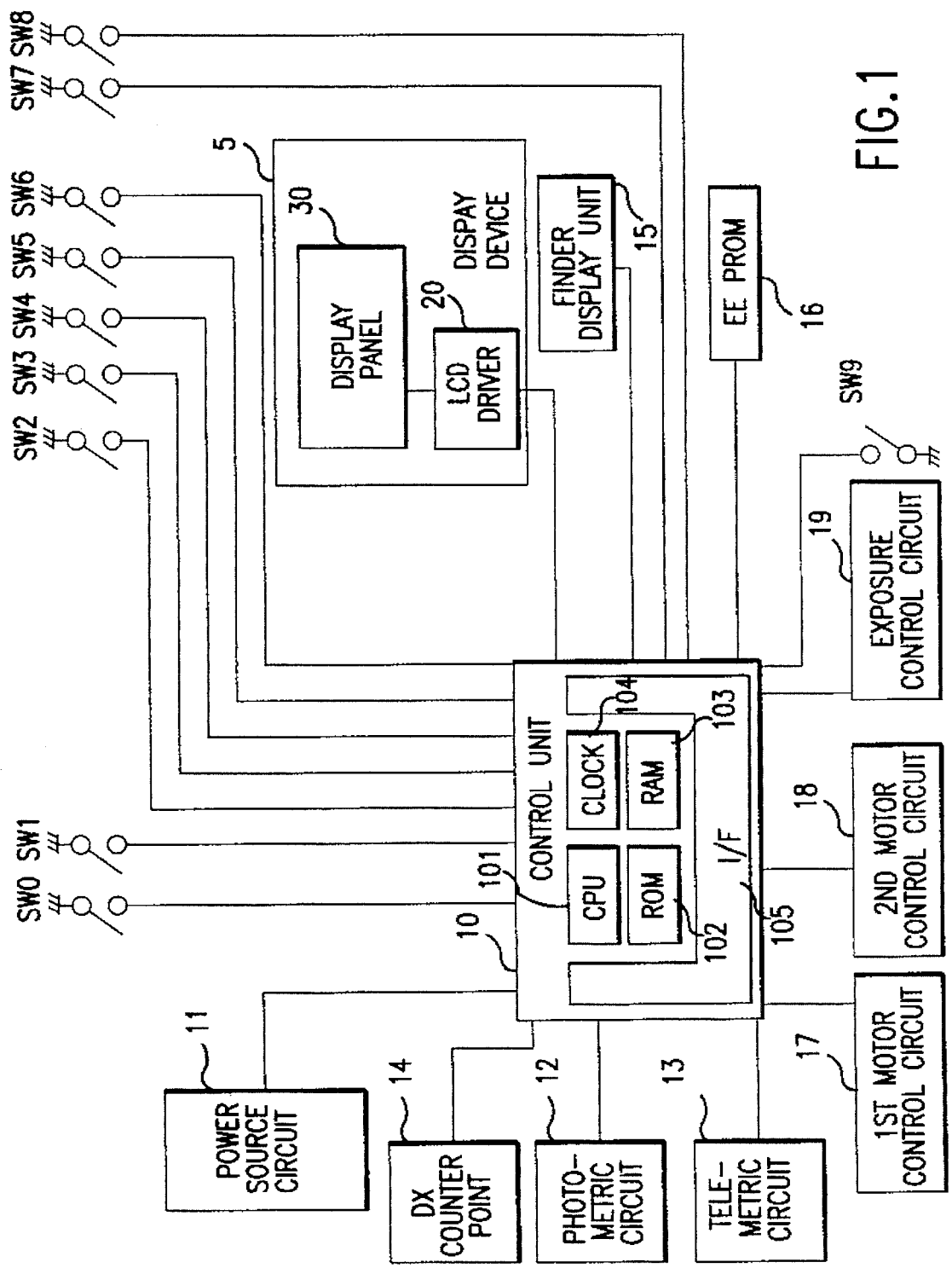
FIG. 1 is a schematic diagram of the hardware system structure of an embodiment of this invention.

A schematic diagram of a preferred embodiment of the camera hardware system is shown in FIG. 1. The camera includes a display device 5 for displaying camera data to the photographer and a control unit (MCU) 10 connected to the display device 5 for controlling the camera.

Control unit 10 is also connected to a photometric circuit 12 for measuring light intensity, a telemetric circuit 13 that measures distance, and a DX contact point 14 that reads a DX film sensitivity. A first motor control circuit 17, a second motor control circuit 18, an exposure control circuit 19, an EEPROM 16 (re-writable read only memory) that is a nonvolatile memory for saving data after power is cut off, and a finder display unit 15 are also connected to control unit 10. The control unit 10 controls and monitors the above devices. Other sensors (not shown in the drawing) may also be installed to monitor the operations of the camera. These sensors will also be controlled by the control unit 10. Additionally, an power source circuit 11 is coupled to the control unit 10 to control and supply power to the control unit 10 and the other devices of the hardware system.

The first motor control circuit 17 controls a motor that drives the lens. In a preferred embodiment, the first motor control circuit 17 controls driving of a zoom drive and a focus drive. The second motor drive circuit 18 controls the mirror up and down drive and the film supply drive. The exposure control circuit 19 controls the aperture, the shutter and the adjustment of light.

Figure 2:
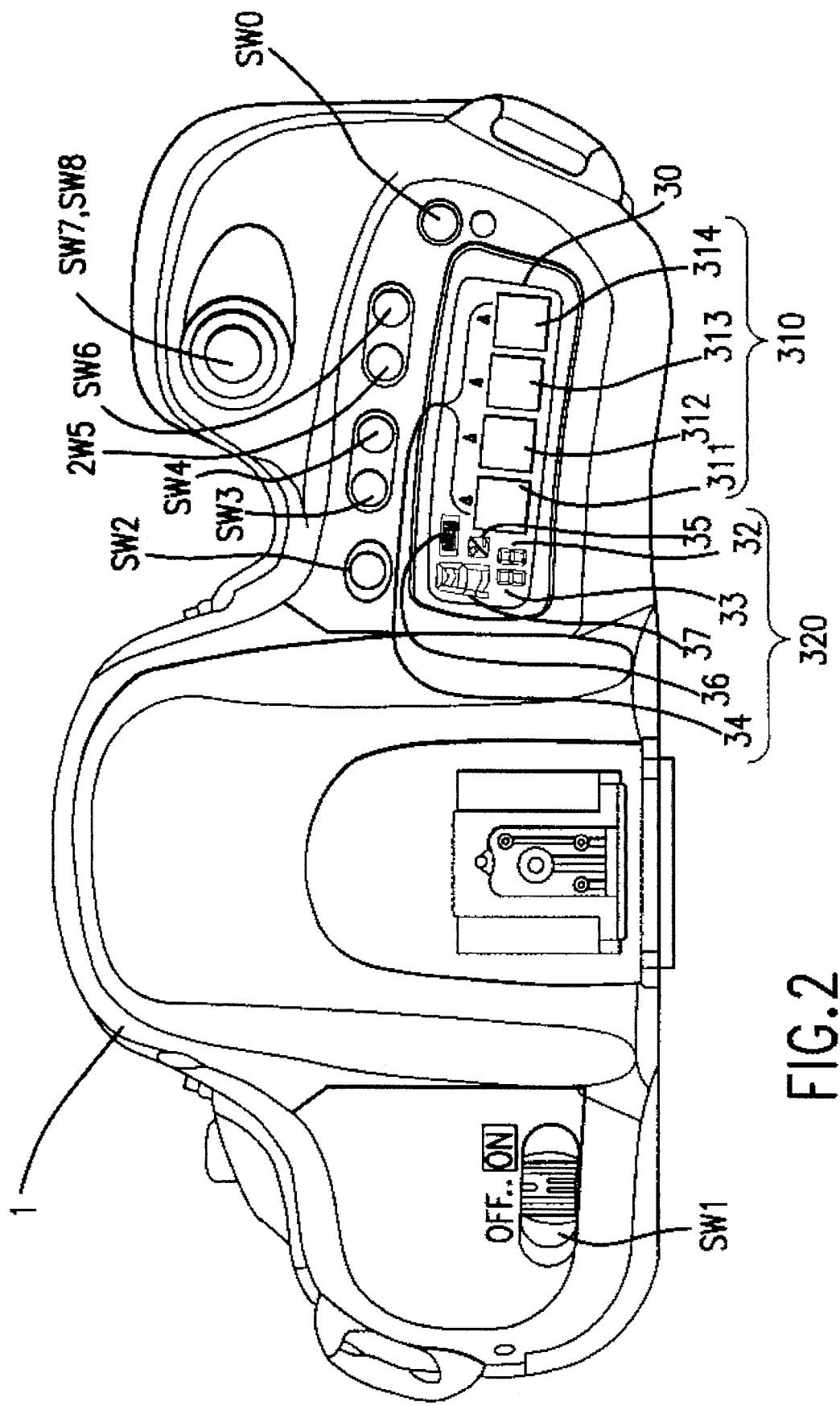
FIG. 2 is a top view of the external appearance of the upper surface body of the camera including switches and displays.

The display device 5 includes a display panel 30 and an LCD driver 20. FIG. 2 shows a preferred embodiment of a camera body's external upper surface. In FIG. 2, the display panel 30 is installed on the right side section of the upper surface of the camera body 1. The LCD driver 20, which drives the display panel 30, is installed inside the camera body 1. The display panel 30 is an LCD panel and includes a dot matrix display component 310 and a segment display component 320.

Figure 4A:
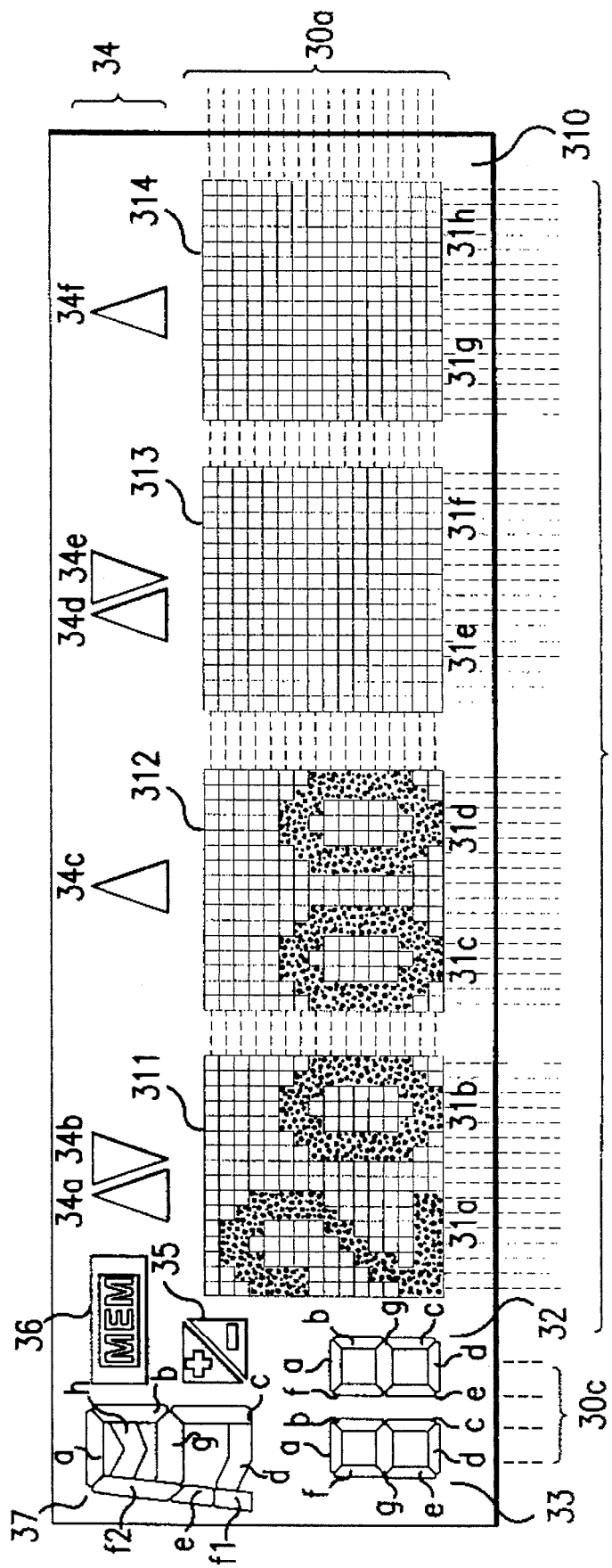
FIG. 4a is an expanded view of a display panel.

FIG. 4a shows the dot matrix display component 310 having four display blocks 311, 312, 313 and 314 horizontally placed. Each display block 311–314 has a column width of one em pica. An em is the space occupied by an "M" in pica-size type. The display blocks 311–314 are divided into half em units (or one en pica) 31a, 31b, 31h. Each en unit 31a–31h is a dot matrix display unit having 16 vertical dots and 8 horizontal dots. Accordingly, the dot matrix display comprises four display blocks 311–314 organized into four pairs of eight adjoining dot matrix display units (31a and 31b), (31c and 31d), (31e and 31f) and (31g and 31h).

Each display block 311–314 is horizontally separated from adjacent display blocks 311–314 to improve readability. The space separating the display blocks 311–314 reduces confusion especially when multiple symbols are placed above the display blocks 311–314 to correspond to the data being displayed. The space between the display blocks 311–314 allows unique association between each symbol with a corresponding display. Thus, any confusion is eliminated.

Although in a preferred embodiment, the spaces between the display blocks 311–314 of the dot matrix display component 310 do not have LCD dots to display data, LCD dots may be placed in these spaces. If LCD dots are placed in these separating spaces, the display blocks may be separated by displaying empty spaces in these dots separating the displayed patterns.

Figure 4B:
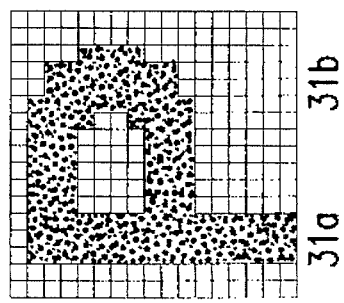

FIG. 4b shows that each pair of the dot matrix display units (31a and 31b) through (31g and 31h) can be used as one 16×16 dot matrix display, displaying, for example, "P". The dot matrix display component 310 contains eight 16×8 dot matrix display units 31a–31h. Every "dot" of each dot matrix display unit 31a–31h is addressed by a combination of 16 common terminals 30a and eight segment terminals. Since there are 8 dot matrix display units 31a–31h in the dot matrix display component 310, the complete dot matrix display component 310 is addressed by the 16 common terminals and 64 segment terminals (eight segment terminals per display unit×eight display units=64 segment terminals).

Data is displayed by the dot matrix display component 310 by first activating one of the common terminals 30a while activating a set of segment terminals 30b. Each of the common terminals 30a selects a row of dots while each of the segment terminals 30b selects a column of dots. When both the row and the column of a dot are selected, the dot becomes active and displays a dot.

For every display cycle, each of the 16 common terminals 30a is activated once, while the segment terminals 30b are activated up to 16 times depending on the data to be displayed. Thus, for each display cycle of 16 possible activations, each of the common terminals 30a is activated once. Accordingly, each of the common terminals has a duty cycle of ¹⁄₁₆.

Although each dot matrix display unit 31a–31h of a preferred embodiment has 16 vertical and eight horizontal dots, the dot matrix display unit 31a–31h may have m×n dots where m and n are positive integers. For example, for m=24 and n=16, the dot matrix display unit 31a–31h has 24×16 dots instead of the 16×8 dots as described above.

are placed facing the dot matrix display component 310. Triangle segments 34a, 34c, 34d and 34f correspond to display blocks 311, 312, 313 and 314, respectively. In addition, triangle segments 34b and 34e are placed with the base of the triangle facing away from the dot matrix display component 310. Triangle segments 34b and 34e correspond to the display blocks 311 and 313 and are placed adjacent the triangle segments 34a and 34d, respectively.

The mode display component 37 is comprised of nine segments 37a, 37b, 37c, 37d, 37e, 37f1, 37f2, 37g and 37h. These nine segments are arranged so that the letters "P," "S," "A," "M," and "F," can be displayed. These letters are the first letters of the names of five possible modes that can be displayed. Segments 37f2 and 37f1 are connected together as common segments. Accordingly, the mode display component 31 has a total of eight independent segments.

The segment display component 320 has a total of 30 segments. The 16 common terminals 30a used to activate the dot matrix display component 310 are also used to activate the segment display component 320. Thus, the segment display component is activated with a ¹⁄₁₆ duty cycle. Since there are 16 common terminals 30a and 30 segments in the segment display component 320, only two unique segment terminals are required to control the segment display component 320. However, four independent segment terminals 30c (seg64, seg65, seg66 and seg67), are used to ease wiring requirements. Accordingly, eight of the 16 common terminals named COM0 through COM7, are used together with the four segment terminals seg64–seg67 to control the segment display component 320.

Table 1 shows the addresses of each of the 30 segments of the segment display component 320 in terms of COM0–COM7 and seg64–seg67. COM0–COM7 label the columns and seg64–seg67 label the rows of Table 1. Each segment is activated when the corresponding common terminal COM0–COM7 and the corresponding segment terminal seg64–seg67 are activated.

The segment display component 320 is controlled similarly to the dot matrix display component 310. Only the shapes of the segments of the segment display component 320 are different from the dots of the dot matrix display component 310.

TABLE 1

|  | COM7 | COM6 | COM5 | COM4 | COM3 | COM2 | COM1 | COM0 |
| --- | --- | --- | --- | --- | --- | --- | --- | --- |
| SEG64 |  | 32g | 32f | 32e | 32d | 32c | 32b | 32a |
| SEG65 |  | 33g | 33f | 33e | 33d | 33c | 33b | 33a |
| SEG66 | 36 | 35 | 34f | 34e | 34d | 34c | 34b | 34a |
| SEG67 | 37h | 37g | 37f | 37e | 37d | 37c | 37b3 | 37a |

FIG. 2 also shows a segment display component 320 having two seven segment display components 32 and 33, an auxiliary display component 34, an exposure adjustment display component 35, a memory mode display component 36, and a mode display component 37, which displays a current mode. FIG. 4a shows that each of the seven segment display components 32 and 33 is composed of seven segments from a through g. The exposure adjustment display component 35 and the memory mode display component 36 have one segment each.

The auxiliary display component 34 is comprised of six pieces of triangle shaped segments (triangle segment) 34a–34f. Bases of triangle segments 34a, 34c, 34d and 34f Although the segment display component 320 may be controlled independently from the dot matrix display component 310 by using independent sets of common terminals COM0–COM7 and segment terminals 30a, no improvement to the display quality is obtained by doing so. Since using the same common terminals 30a to activate both the segment display component 320 and the dot matrix component 310 reduces the number of independent wires, a preferred embodiment uses the same set of common terminals 30a to activate both the segment display component 320 and the dot matrix display component 310.

Figure 3:
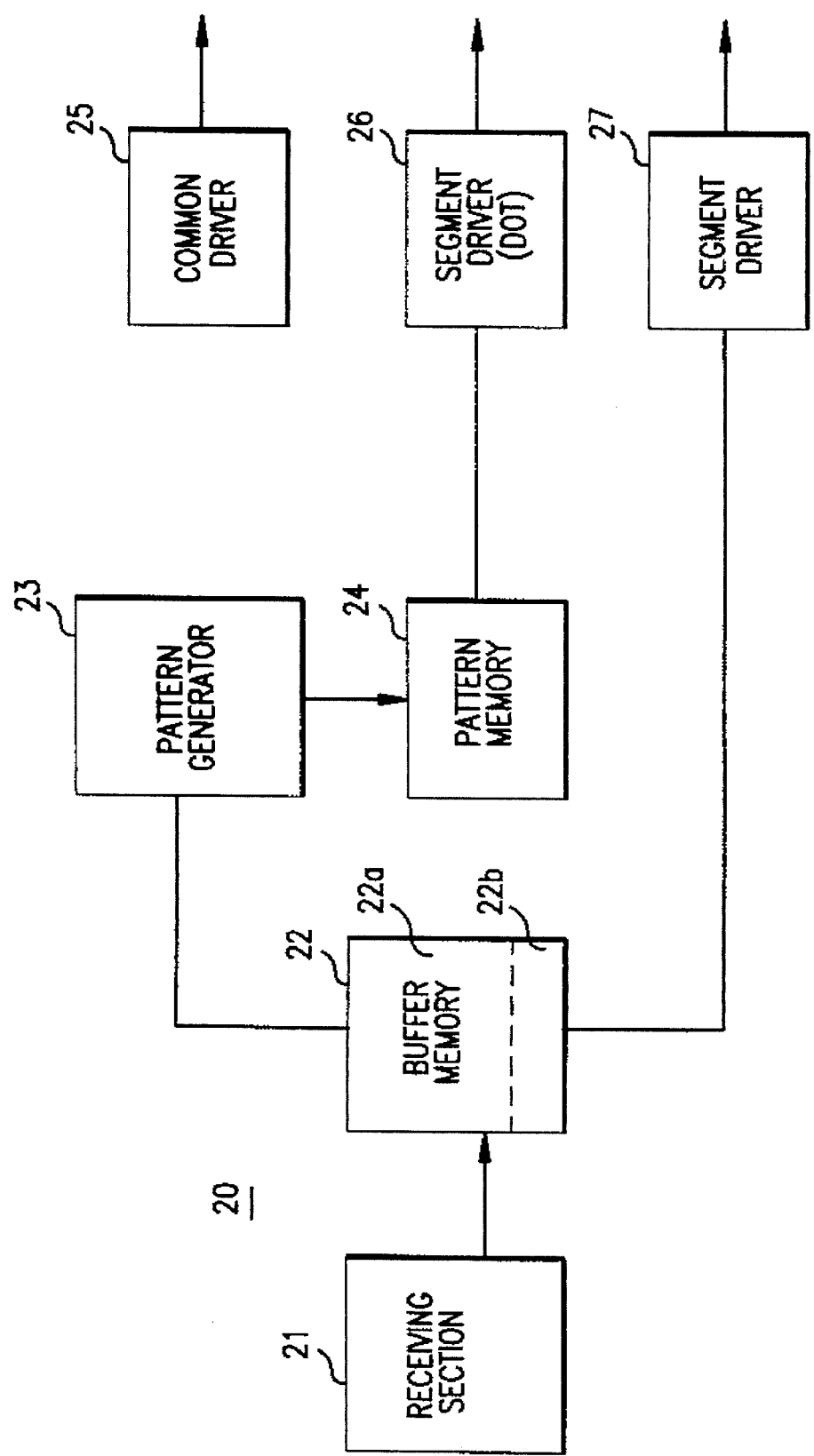
FIG. 3 is a block diagram of a liquid crystal display driver for driving the camera displays shown in FIG. 2.

FIG. 3 shows that the LCD driver 20 includes a receiving component 21 that receives command data from the control unit 10. A buffer memory 22 stores the received command data. A pattern generator 23 reads the control unit 10 command data from the buffer memory 22 and creates icon patterns based on the control unit 10 command data. A pattern memory 24 stores the icon patterns generated by the pattern generator 23. A common driver 25 drives the common terminals 30a of the display panel 30. A first segment driver 26 reads the icon patterns stored in the pattern memory 24. A second segment driver 27 reads segment display data from the buffer memory 22 based on the control unit 10 command data and drives the segment terminals seg64–seg67 of the segment display component 320.

The buffer memory 22 stores 12 bytes of data divided into a dot data memory block 22a and a segment data memory block 22b. The dot data memory block 22a stores command data D0–D7 for the dot matrix display component 310. The segment data memory block 22b stores command data D8–D11 for the segment display component 320.

The common driver 25 drives the common terminals 30a of dot matrix display component 310 and segment display component 320. The first segment driver 26 drives dot matrix display component 310 via segment terminals 30b. The second segment driver 27 drives segment display component 320 via segment terminals 30c.

The pattern generator 23 includes a memory (not shown) and a reading drive circuit (not shown). FIG. 7 shows character and icon display patterns stored in the pattern generator memory. These patterns are symbols that correspond to the contents of selection branches and the contents of warnings and other display characters. In FIG. 7, the first row is the superordination address in hexadecimal, and the first column is the subordination address in hexadecimal. Thus, "Q" is addressed by "30" superordination address and "1" subordination address. Accordingly, "Q" has the address of "31."

Figure 5:
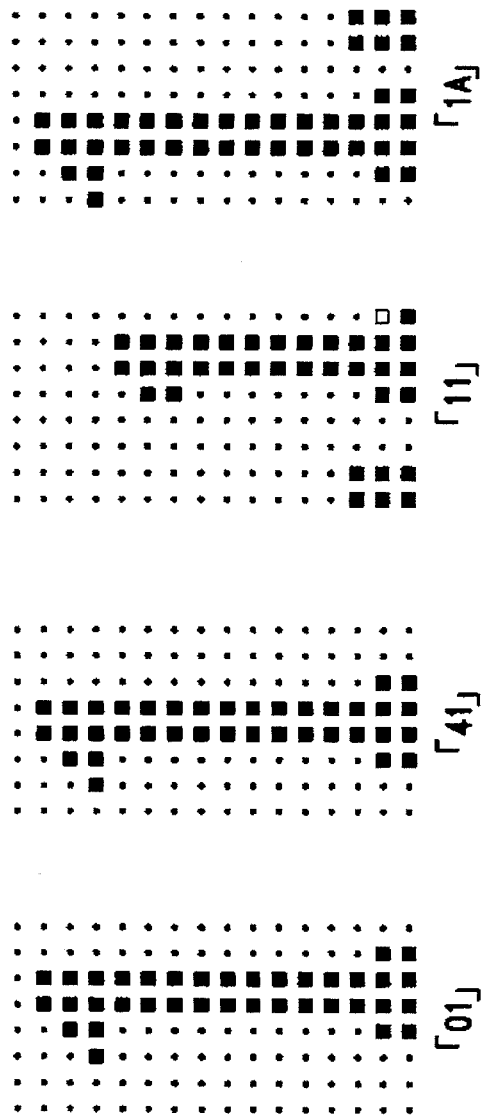

The numeral patterns between the address "00"–"0A" and "40"–"4A" are similar to the display pattern shown in FIGS. 5a and 5b, respectively. The position of the patterns of the addresses "00"–"0A" are slightly shifted to the left while the positions of the patterns of the addresses "40"–"4A" are slightly shifted to the right. These slight shifts compensate for the space between each display block when numerical digits are displayed across multiple display blocks 311–314.

These slight shifts also allow displaying the numerical characters in a well balanced manner by selecting a numeral pattern that is shifted either to the left or to the right. For example, in FIG. 4a, the "0" displayed in the display blocks 31b and 31c are selected from the addresses "4A" and "00", respectively. The "0" in the address "4A" is identical in shape to the "0s" in the address "0A". However, the "0" in the address "4A" is displaced to the left by 1 dot. Thus, the space between the display blocks 311–314 can be balanced. Accordingly, it is possible to arrange the displayed numerical characters in the dot matrix display component 310 in a well balanced and spaced manner.

FIGS. 5c and 5d show numerical patterns to include a decimal point for the display of numerals having a decimal point. This eliminates an additional display digit for the decimal point and conserves the number of required digits that must be displayed. In addition, including a decimal point with numerical patterns permits a well balanced display as a whole.

FIG. 7 also shows that numeric characters less than 1 are made small. This corresponds to the custom of displaying small numerals for numbers less than one, as in the display of an F value in a camera.

Figure 6B:
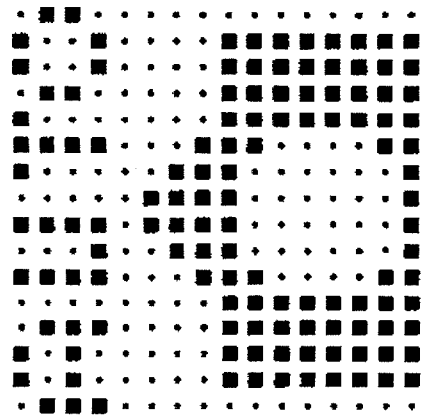
Figure 6A:
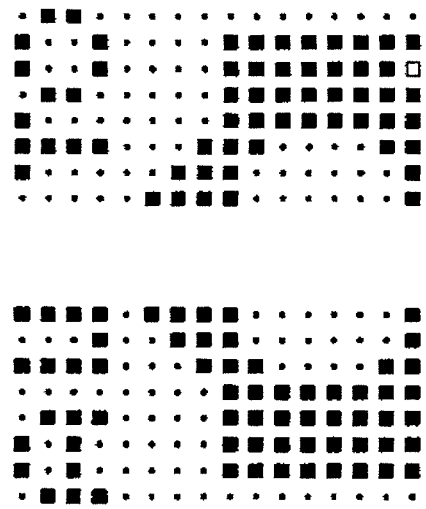

FIG. 7 is divided into two parts. The first part includes patterns having addresses "00"–"7F"; these are the en displays to be displayed by the dot matrix display units 31a–31h. The second part includes patterns having addresses "80"–"FF". These patterns are em displays to be displayed by the dot matrix display blocks 311–314. For the em display patterns (after address "80"), the patterns are shown in pairs. For example, the patterns at address "80" and "81" are identical. However, as shown in FIG. 6a, each of the patterns are divided into a left half and a right half. The left half is selected by an even address and the right half is selected by an odd address. The left half and the right half of each pair form one continuous pattern. Therefore, combining the left and right halves as shown in FIG. 6b creates the "AUTO" display pattern. In FIGS. 5a–5d and FIGS. 6a and 6b, the "."s are blank spaces and are shown to indicate possible dot positions.

Further, FIG. 7 includes dot patterns of numerals, letters and icons that are not used for this embodiment. These can be displayed by designating the appropriate addresses. In this manner, the patterns not used are stored in the pattern generator memory so that the pattern generator 23 can be commonly used among many cameras resulting in camera cost reduction.

Referring back to FIG. 1, the control unit 10 includes a central process unit (CPU) 101. The CPU 101 performs processes such as monitoring and controlling the camera. A ROM (read only memory) 102 stores programs and constants. The ROM 102 is part of a system for controlling camera operations. A RAM (random access memory) 103 stores data reflecting the present status of the camera and also provides a work space for calculations. A clock circuit 104 and interface circuit (I/F) 105 supports the input and output processes with devices of an external section. In addition, the CPU 101 includes a timer function used for timing operations.

The switches SW0–SW9 are connected to the control unit 10 via the input port of the interface circuit 105. The switches SW0–SW8 are placed on the upper surface of the camera body 1 as shown in FIG. 2.

The switch SW0 is the mode switch. When the switch SW0 is OFF, a simple mode is designated, and when the switch SW0 is ON, an advanced mode is designated. The simple mode selects one branch of parameters from a limited number of selection branches and inputs parameters of the selected branch. This mode is suitable for photographers who are not accustomed to the camera. In the advanced mode, selection may be made from a plurality of selection branches. Parameters may be input for each selected branch according to the desire of the photographer. The advanced mode is most suitable for photographers needing high camera functionality.

The switch SW1 is the power source switch. SW2 is the switch located at the left-most position of the LCD display panel 30 as shown in FIG. 2. The switch SW2 is used to change the operation of the camera and functions as a menu button to bring up a selection menu. The switches SW3–SW6 correspond to the four display blocks 311–314. The switches SW7 and SW8 are part of a release button. The switch SW7 is a half-depression switch and operates with the first stroke of the release button. The switch SW8 is the release switch and operates with the second stroke of the release button. The switch SW9 is a back cover switch.

The display blocks 311–314 of the dot matrix display component 310 are placed horizontally, as shown in FIGS. 2 and 4a. The switches SW3–SW6 are also placed horizontally and parallel to the display blocks 311–314. The switches SW3–SW6 are arranged so that each switch corresponds uniquely to a respective display block 311–314. The icons representing the selection branches are displayed by the control unit 10 on display blocks 311–314 so that each displayed icon is uniquely associated with one of the switches SW3–SW6.

The switches SW3–SW6 are placed on the front right side of the upper surface of the camera body 1 so that the switches SW3–SW6 can be easily operated with the camera body 1 in the photographer's hand. The index finger of the photographer's hand is naturally positioned to operate the switches SW3–SW6. The switch SW2 is located a small space from the switch SW3 toward the camera body 1 center. As a result, when the switches SW3–SW6 are operated, the danger of accidentally operating the switch SW2 is reduced. This is especially true for the switch SW3 since the switch SW2 is closest to the switch SW3.

The switches SW3–SW6 and the second switch SW2 are push-button switches. Of course, the switches are not limited to push-button switches and can be other types of switches such as touch sensitive switches.

The triangle segments 34a–34f of the auxiliary display section 34 function as display elements that visually indicates the corresponding relationship between the icons of the selection branches displayed on display blocks 311–314 and the switches SW3–SW6. For that reason, the auxiliary display section 34 is placed between display blocks 311–314 and the switches SW3–SW6 as shown in FIG. 2.

The placement of the display blocks 311–314, the switches SW3–SW6 and the auxiliary display section 34 enable the triangle segments 34a–34f of auxiliary display section 34 to function as a graphic pattern suggesting direction. By glancing at the display icons on display blocks 311–314, the photographer naturally selects one of the switches directly above the displayed icon. If the triangle segment of auxiliary display section 34 is in the shape of a triangle, the photographer will be given an intuitive understanding that the switch located in the direction pointed to by the tip of the triangle segment 34a–34f should be pushed.

The RAM 103 contains a state register M0 and a mode register M1. The memory contents of these registers 15 are shown in Table 2 and Tables 3A and 3B.

TABLE 2

| M0 | State Register | |
|---|---|---|
| 0 | Non-selection state (Execution screen) | Simple mode |
| 1 | Mode selection state (Selection screen) | |
| 2 | Function selection state (Selection screen) | Advanced mode |

In other words, the status register M0 is a register indicating the state of the camera. As possible states, the register indicates whether the screen displayed on the dot matrix display component 310 is a first display displaying the selection choices, i.e., a screen for the state in which selection is possible (a selection state screen); a second display displaying the selected state, i.e., a screen for the non-selection state (an execution state screen); or a screen for the state in which a function can be selected (a selection state screen). These states are indicated by the number 0, 1 and 2, respectively. In the case of the simple mode, only states 0 and 1 are possible, while in the case of the advanced mode, 0, 1 and 2 are all possible.

In a preferred embodiment, the mode register M1 has two bits and can be set to one of the four values corresponding to four modes as shown in Table 3A. These modes include the automatic mode, scenery mode, portrait mode and close up mode. These four modes are all program exposure modes. The automatic mode is a program mode that is able to combine the most generally used shutter speed and the aperture value. The scenery mode, portrait mode and the close up mode are program modes that select the combination of the shutter speed and the aperture value that is most effective for the object to be photographed. The mode can be selected using the first display. These selections are data input into the camera and specify parameters designating the operational conditions of the camera.

TABLE 3A

| M1 | 2 Bits | Mode register |
|---|---|---|
| 0 | 0 0 | Automatic mode |
| 1 | 0 1 | Scenery mode |
| 2 | 1 0 | Portrait mode |
| 3 | 1 1 | Close up mode |

TABLE 3B

| M0 | State Register | |
|---|---|---|
| 0 | P0: Automatic mode | |
| 1 | P1: Scenery mode | Simple mode |
| 2 | P2: Portrait mode | |
| 3 | P3: Close up mode | |
| 4 | P4: Sports mode | |
| 5 | P5: Night view mode | |
| 6 | P6: Silhouette mode | Advanced mode |
| 7 | P7: Inspiration mode | |
| 8 | S: Shutter priority mode | |
| 9 | A: Aperature priority mode | |
| 10 | M: Manual mode | |

Table 3B shows a second preferred embodiment offering a more complex set of eleven modes from 0 to 10.

The modes may be selected by setting the mode register M1. Modes 0–3 are the simple modes. Mode 0 is the automatic mode P0, mode I is the scenery mode P1, mode 2 is the portrait mode P2, and mode 3 is the close up mode P3. Each of these modes can be selectively set. All of these four simple modes are program exposure modes. The automatic mode provides the combination of the most general shutter speed and aperture value. Each of the scenery mode, the portrait mode and the close up mode provide combinations of the shutter speed and the aperture value to create the most effective picture for each object to be photographed.

Modes 4–10 are advanced modes. The advanced modes are the sports mode P4, the night view mode P5, the silhouette mode P6, the inspiration mode P7, the shutter priority mode S, aperture priority mode A and the manual mode M. As a rule, both the simple and advanced modes can be selected using a first display screen. The mode selections are input into the camera as parameters similar to other parameter inputs that set the operational terms of the camera.

The control unit 10 formats the command data in the RAM 103 as shown in Table 4. The command data is 12 bytes labelled D0–D11. Each byte from D0–D1 is serially transferred to the LCD driver 20 in a sequential order, starting with command data D0 and ending with command data D11. D0 corresponds to the data to be displayed on display unit 31a, D1 corresponds to the data to be displayed on display unit 31b and so on through D7, which corresponds to the data to be displayed on display unit 31h. D8–D11 correspond to the data to be displayed on the segment displays 32–37, respectively. The data for displaying each display section is stored in each byte.

The command data D0–D7 are the hexidecimal memory addresses of the pattern generator memory that contains the character and icon patterns to be displayed. Accordingly, the pattern generator 23 uses the command data D0–D7 to access the desired pattern.

The command data D8–D11 specify the segment to be activated corresponding to the segment display component 302 including segment displays 32–37. The command data D8 activates the segments a-g of the segment display 32 using the bits 0–6. The command data D9 activates the segments a-g of the segment display 33 using the bits 0–6. The command data D10 activates the segments a-f of the auxiliary display 34 using the bits 0–5, and the command data D10 activates the memory mode display 36 and the exposure auxiliary display 35 using the bits 7 and 6. The command data D11 activates the segments a-h of the mode display 37 using bits 0–7.

TABLE 4

| MCU Data | Command | Contents |
| --- | --- | --- |
| D0 | 1 byte | Dot matrix 31a data for display |
| D1 | 2 | Dot matrix 31b data for display |
| D2 | 3 | Dot matrix 31c data for display |
| D3 | 4 | Dot matrix 31d data for display |
| D4 | 5 | Dot matrix 31e data for display |
| D5 | 6 | Dot matrix 31f data for display |
| D6 | 7 | Dot matrix 31g data for display |
| D7 | 8 | Dot matrix 31h data for display |
| D8 | 9 | Segment display data for 32 |
| D9 | 10 | Segment display data for 33 |
| D10 | 11 | Segment display data for 34 through 36 |
| D11 | 12 | Segment display data for 37 |

For the command data shown in Table 4, the display blocks 311–314 are used as en display units. Display patterns, using each of the display blocks 311-314 as a single display block em, are also possible.

When the segment displays alternate between a blank and another pattern at a specified cycle, the segment displays will appear to flash. Since a "0" value is a blank and a "1" value is a non-blank, the segment displays will flash when all the "1"s of the command data D8–D11 alternate between a "0" and a "1".

The control unit 10 also includes a mode register M3 in the RAM 103. The data format of the mode register M3 and the EEPROM 16 is identical to the format shown in Tables 3A and 3B. When the menu button SW2 is continuously pushed for a specified time (for more than 1 second in this embodiment), the mode is changed to the automatic mode (referred to as a default jump). In addition, if a desirable mode among the possible modes shown in Table 3A or 3B, is stored in the mode register M3, the camera mode can be changed to the mode stored in the mode register M3 at the time of the default jump.

The RAM 103 of the control unit 10 loses its contents when the power source is cut off. Therefore, when the power source is cut off, the contents of the mode register M3 is saved into the EEPROM 16. If the desired mode is not saved in the mode register M3, the mode register M3 is set to 0 corresponding to the automatic mode.

In a preferred embodiment, the control unit 10 controls a menu display process that provides an opportunity for the photographer to select a camera mode. The control unit 10 provides further selection processes after the selection of the camera mode until a conclusive selective process is reached for the selected camera mode. The control unit 10 also controls a change of the camera mode and a skip process to a specific camera mode. In addition, the control unit 10 provides a process to set the film sensitivity.

The mode switch SW0 selects the simple mode and the advanced mode. Depending upon the mode, the relationship of the display panel 30 and the mode switch SW0 may differ. The display panel 30 allows the input of numerous information using the same display mode with the same switches by operating the selection process in the same manner. This is particularly true because the icon indicating the selection branches correspond by column to the switches and is easily seen and selected.

The advanced mode and the simple mode each is associated with a corresponding display screen displayed on the display units 31a–31h. The functions of the switches SW3–SW6 are defined by Table 5 and Table 6 for the advanced mode and the simple mode, respectively.

TABLE 5

| M1 | Advanced mode | SW3 | SW4 | SW5 | SW6 |
| --- | --- | --- | --- | --- | --- |
| 0 | Automatic mode | | | −½ program shift | −½ program shift |
| 1 | | | | | |
| 7 | | | | | |
| 8 | Shutter priority mode | TV − ½ | TV + ½ | | |
| 9 | Aperture priority mode | AV − ½ | AV + ½ | | |
| 10 | Manual mode | TV − ½ | TV + ½ | AV − ½ | AV + ½ |

TABLE 6

| | SW3 | SW4 | SW5 | SW6 |
| --- | --- | --- | --- | --- |
| Simple mode | P0 selection | P1 selection | P2 selection | P3 selection |

The state of the display screen being displayed on the dot matrix display section 310 is stored in the RAM 103 by a screen register M2. Table 7 shows the functions of the switches SW3–SW6 based on the contents of the screen register M2 for the advanced mode. The screen register M2 is not used for the simple mode.

Figure 16:
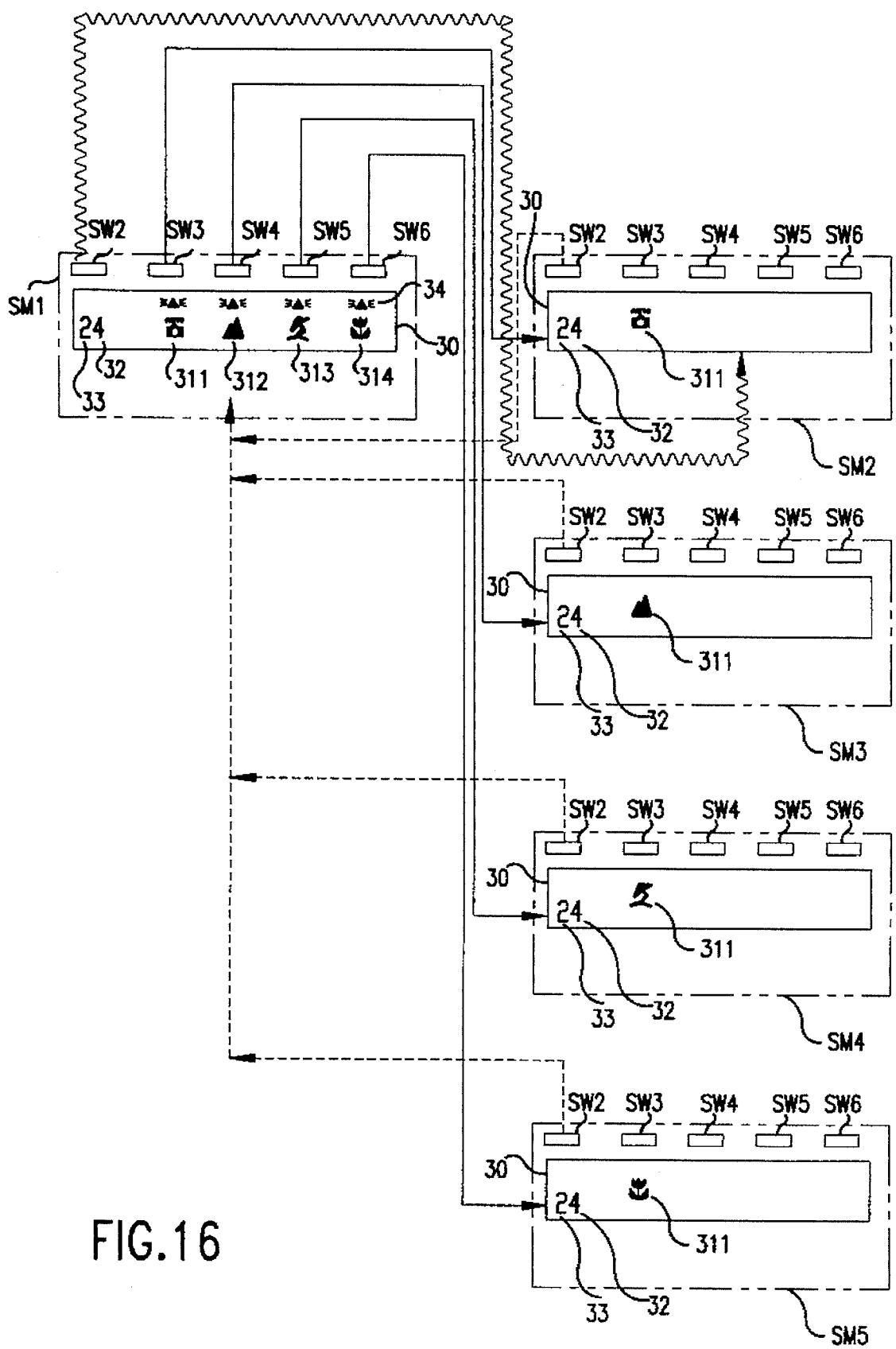
FIG. 16 is a diagram of the simple mode display screens.
Figure 17A:
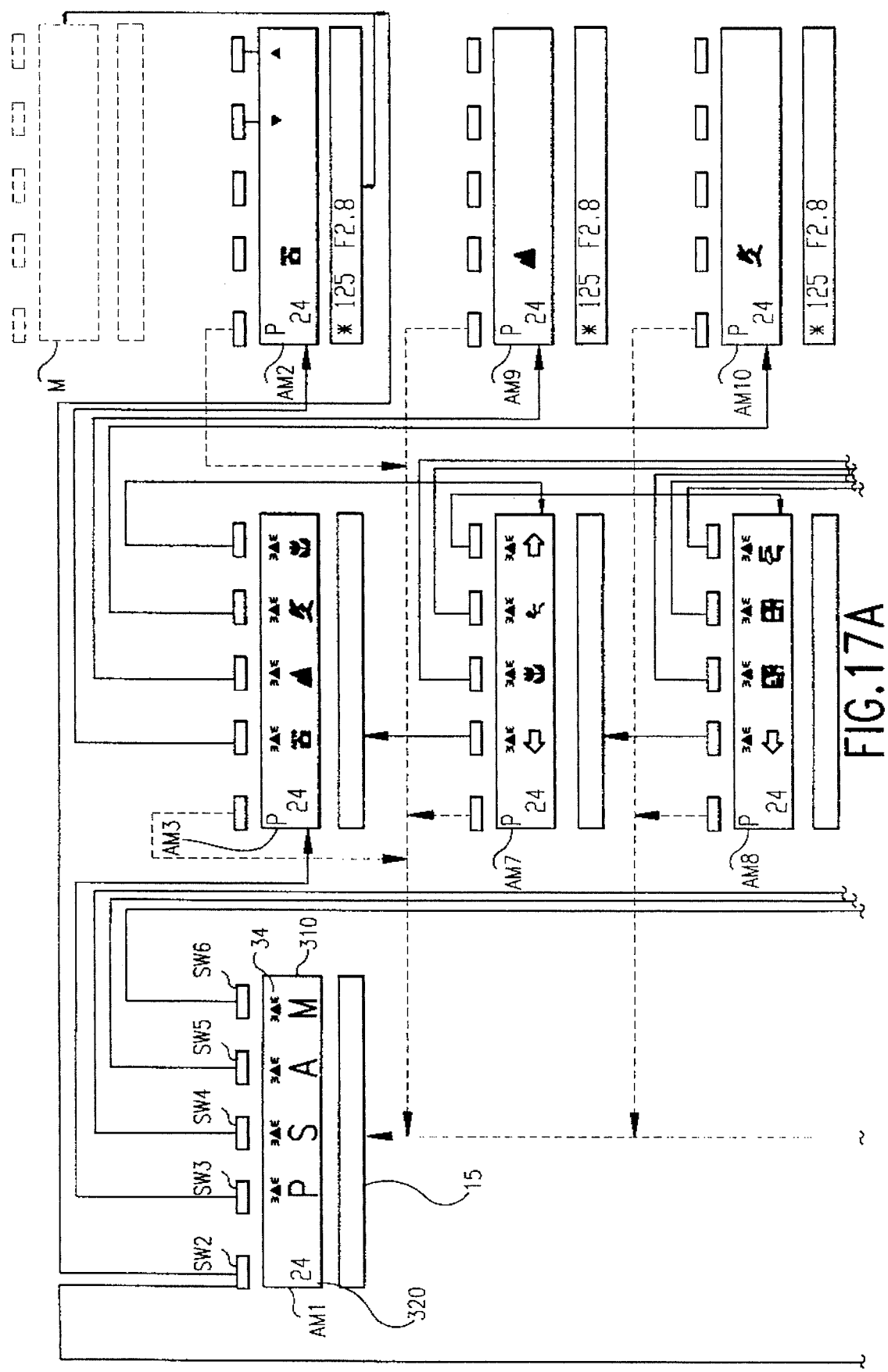
FIG. 17 is a diagram of the advanced mode display screens.
Figure 17B:
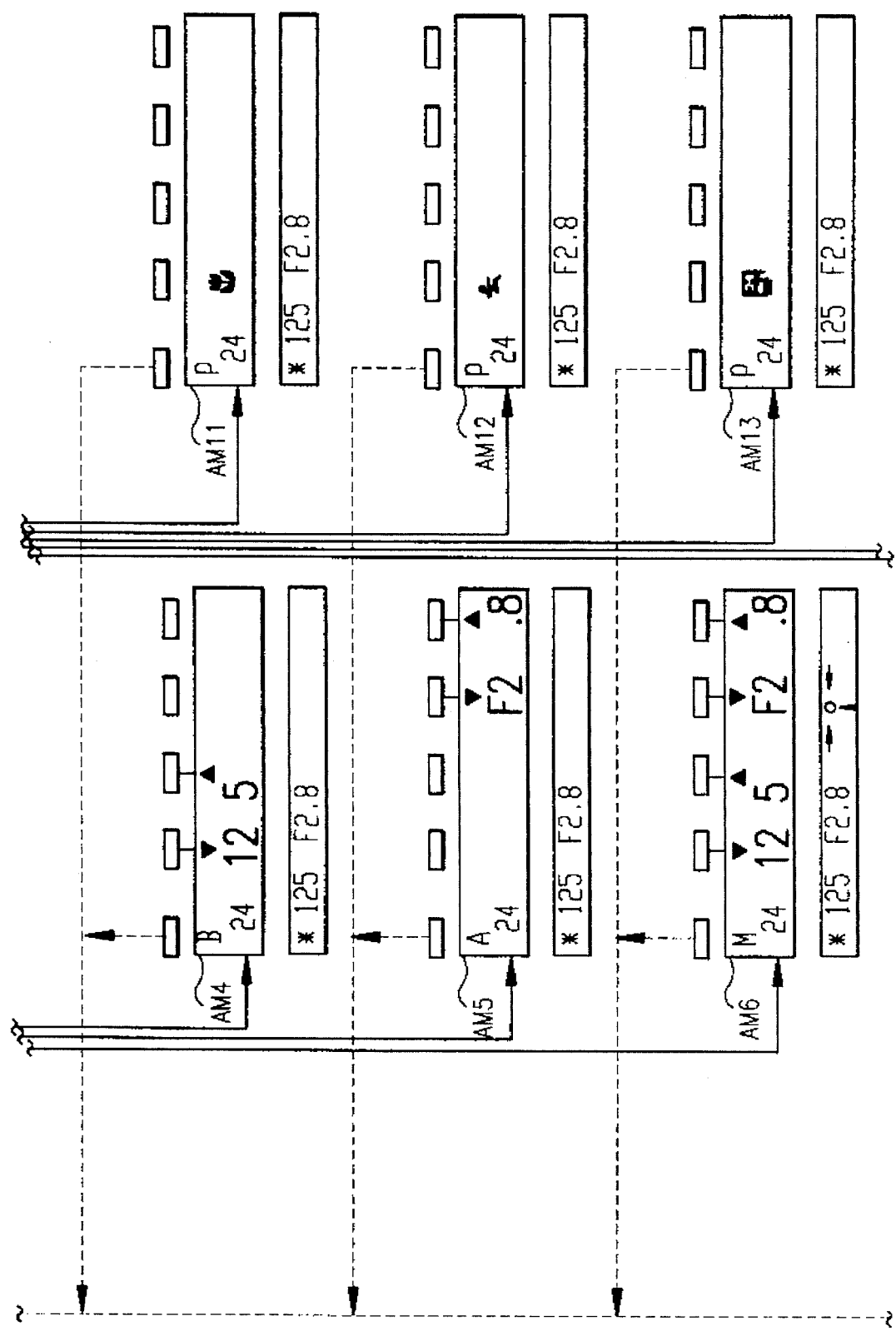
Figure 17C:
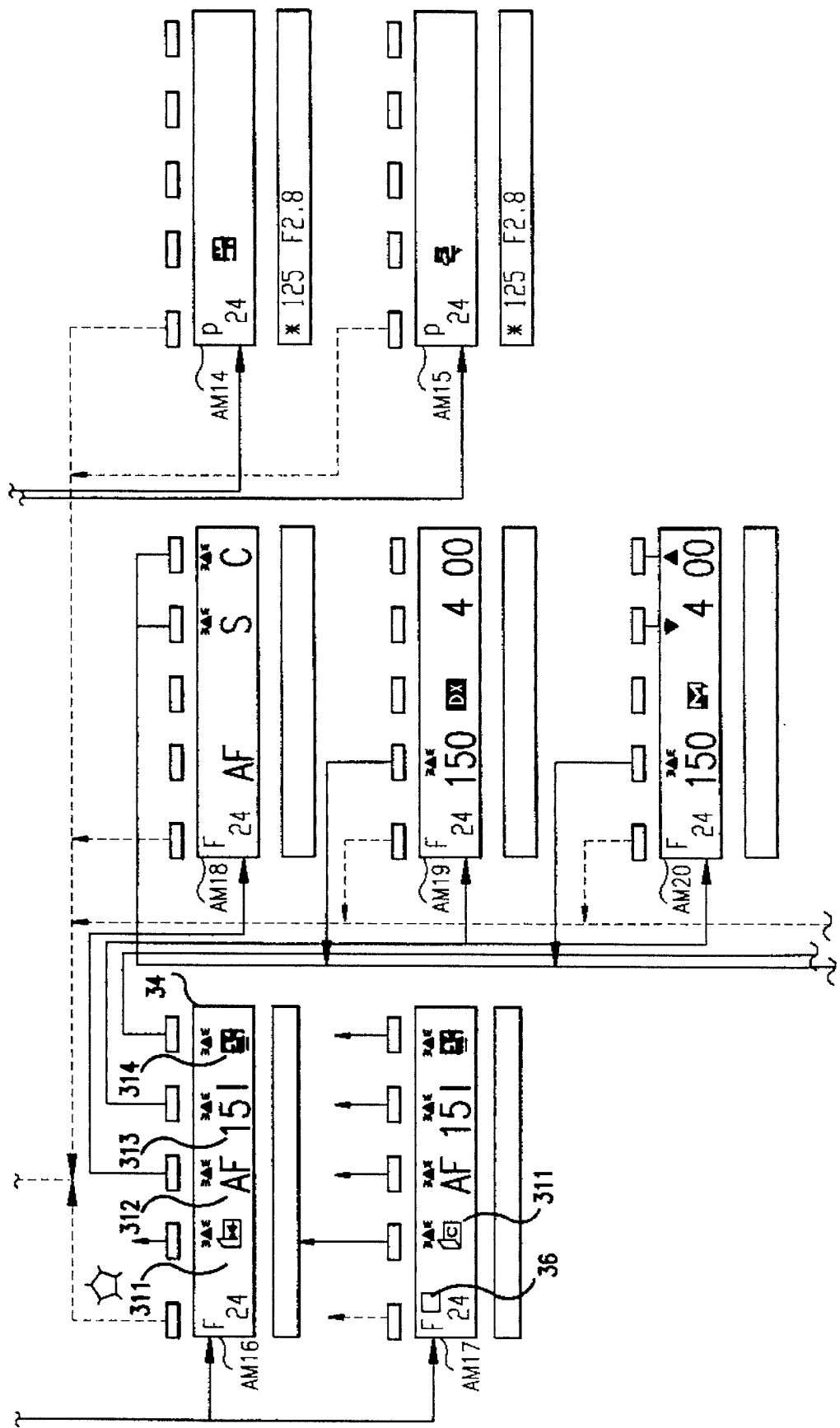
Figure 17D:
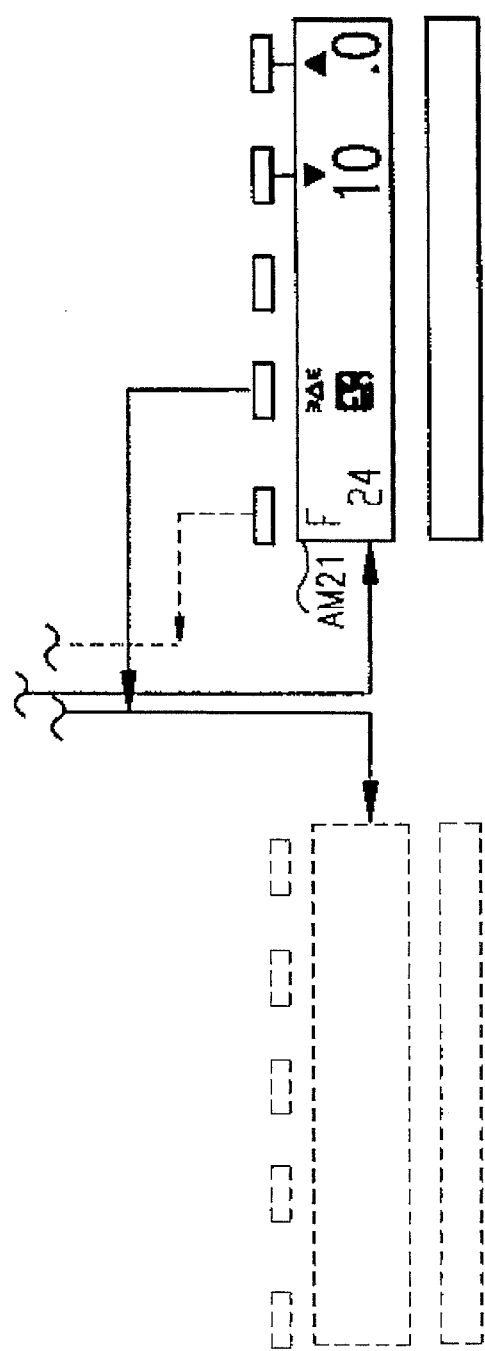
Figure 18A:
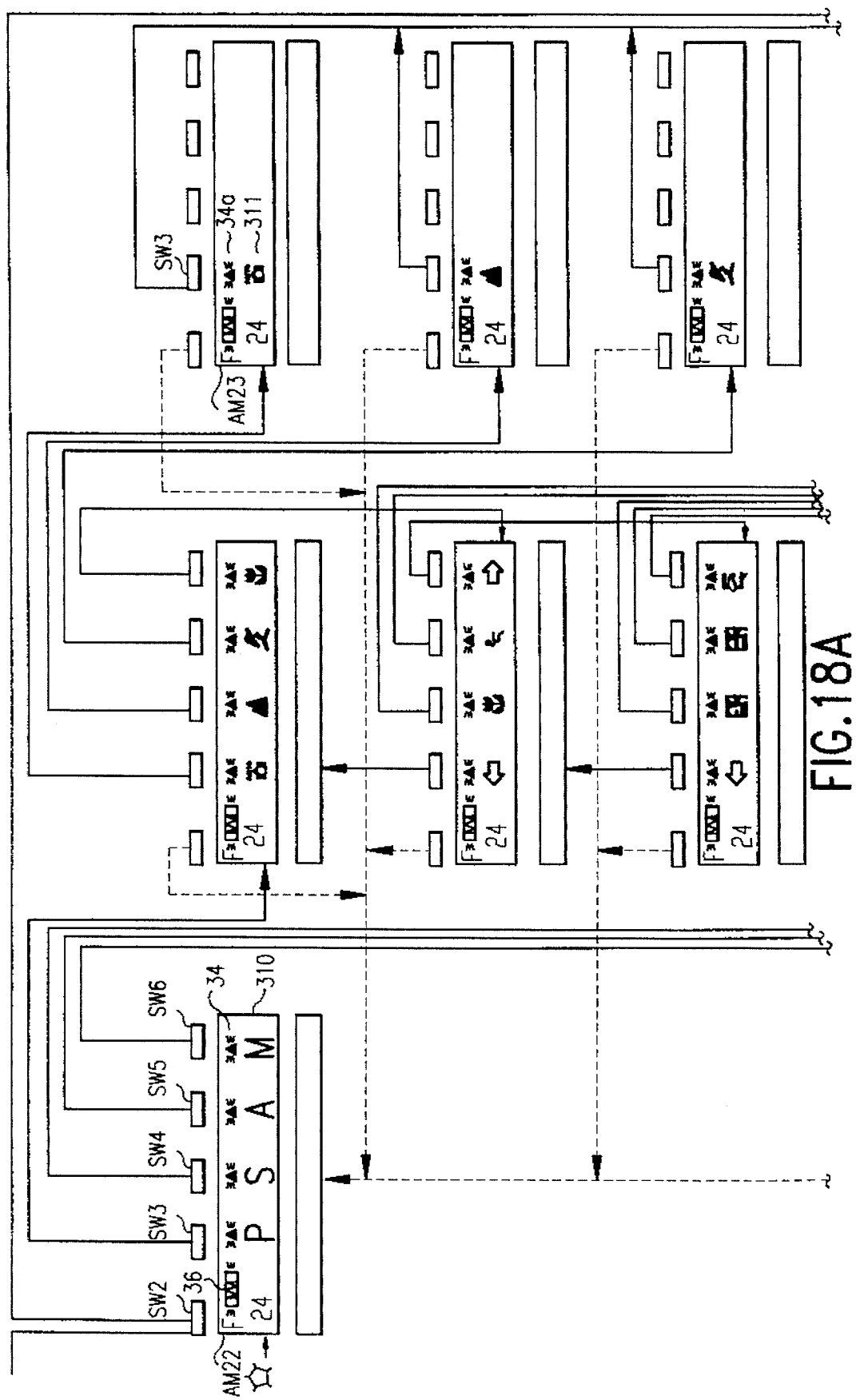
FIG. 18 is a diagram of the advanced mode memory registration display screens.
Figure 18B:
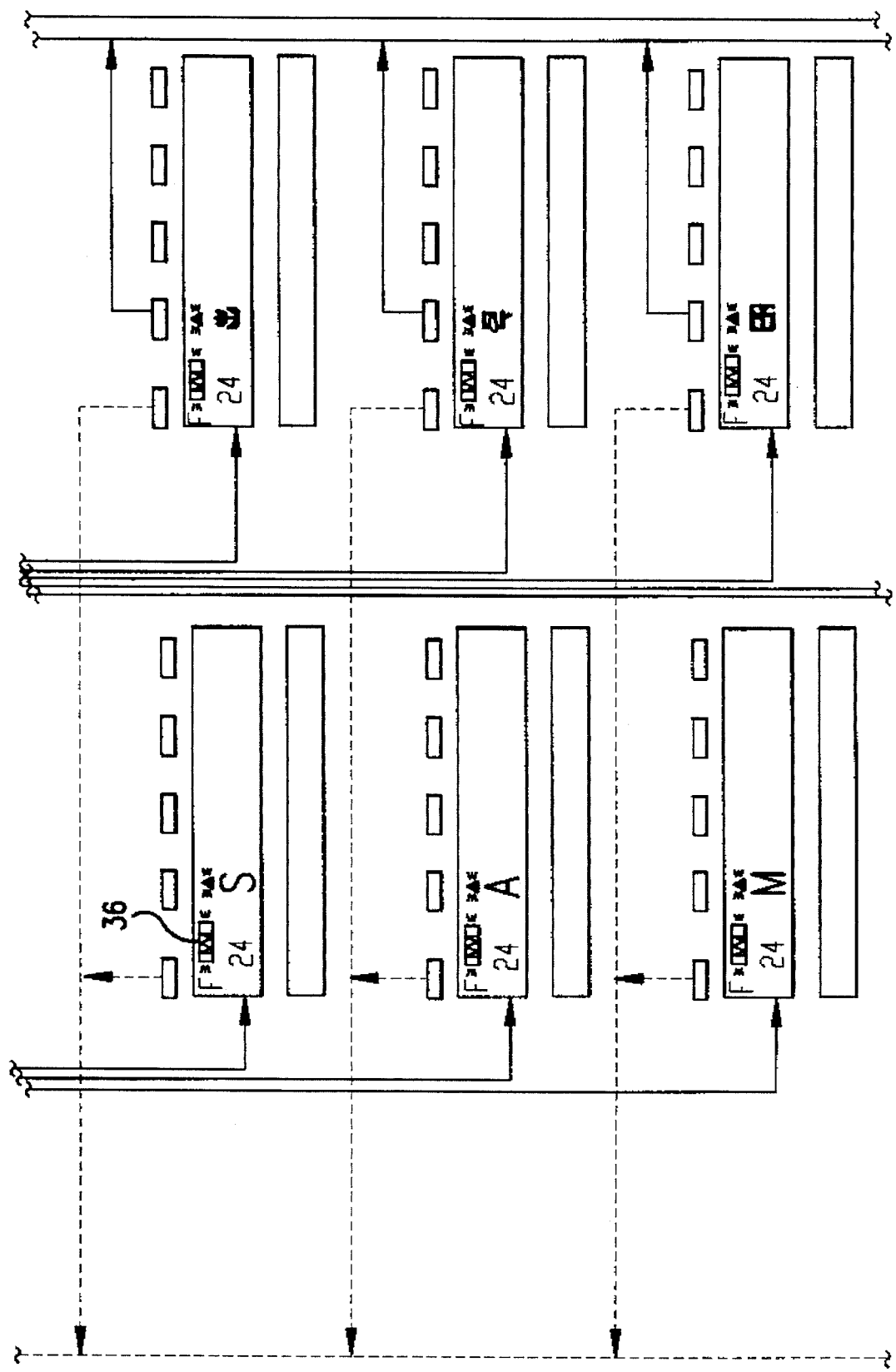
Figure 18C:
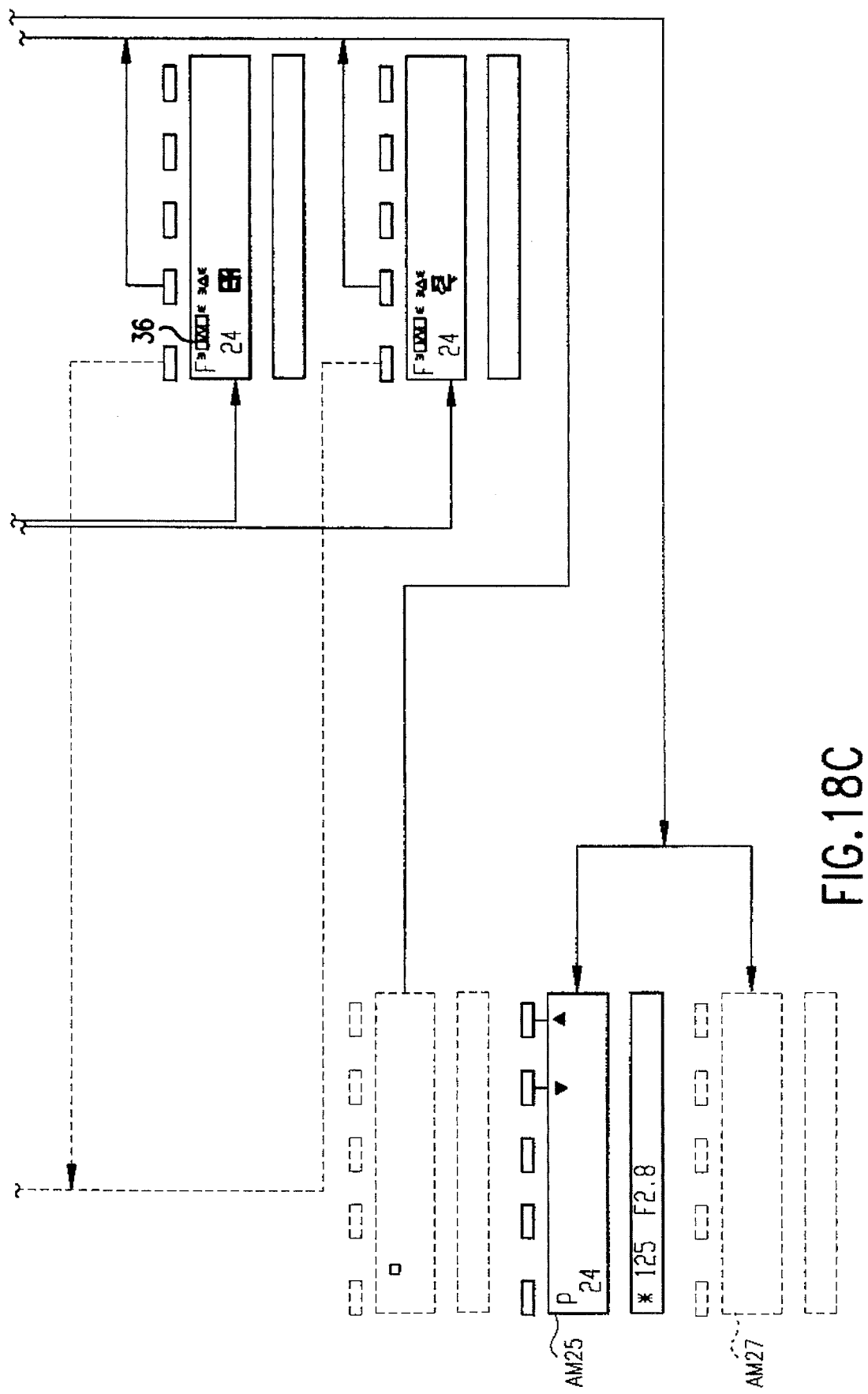

FIGS. 16–18 show the corresponding relationship of the display screen on the display panel 30 and the switch operations of switches SW2–SW6. FIG. 16 shows the correspondence between the display screen and the switches SW2–SW6 in the simple mode. The small rectangular shaped blocks shown at the upper section of the display panel 30 are the switches SW2–SW6. FIG. 17 and FIG. 18 show the display screen and the switches SW2–SW6 for the advanced mode. In FIGS. 17 and 18, the graphic pattern elements are small. Therefore, the label numbers are not shown other than for special cases. Refer to FIG. 16 for the label numbers since the display screens are the same for FIGS. 17 and 18 as for FIG. 16. Also, in FIGS. 17 and 18, the rectangular block below the display panel 30 is the finder display unit 15. In addition, in FIGS. 16–18, the top left display screen is the first display screen of the first display, and the straight lines connecting the switches SW2–SW6 and the display screens indicate a second display when the switches SW2–SW6 are pushed or switched ON. The dotted lines indicate the return to the first display when the switch SW2 is switched ON while the display panel 30 is displaying the second display. The wavy line indicates the second display when the switch SW2 is ON for a specified period of time.

mode is selected by pushing the switch SW3; SM3 is the display screen of the second display when the scenery mode is selected by pushing the switch SW4; SM4 is the display screen of the second display when the portrait mode is selected by pushing SW5; and SM5 is the display screen of the second display when the close up mode is selected by pushing SW6. If while a display screen of the second display is displayed and the switch SW2 is pushed, the second display mode is canceled, and the display screen of the first display SM1 is displayed. In addition, if while the display screen SM1 is displayed and the switch SW2 is continuously pushed for a specified time (for example, 1 second), the automatic mode is entered, and the display screen SM2 is displayed.

The advanced mode is selected by operating switch SW0. Generally, if a mode was previously selected, the display screen of the selected mode would be displayed on the

TABLE 7

| M2 | Screen register | SW3 | SW4 | SW5 | SW6 |
|---|---|---|---|---|---|
| 0 | Mode selection display screen | M2 ←1 | S selection | A selection | M selection |
| 1 | P0–P2 selection display screen | P0 selection | P1 selection | P2 selection | M2 ←2 |
| 2 | P3, P4 selection display screen | M2 ←1 selection | P3 selection | P4 selection | M2 ←3 |
| 3 | P5–P7 selection display screen | M2 ←2 selection | P5 selection | P6 selection | P7 selection |
| 4 | Function First display screen | M2 ←0 M2 ←4 | M2 ←5 | M2 ←6 | M2 ←7 |
| 5 | AF mode setting display screen | | | AF − S | AF − C |
| 6 | Film sensitivity setting display screen | Setting completed | — | SV − ⅓ | SV + ⅓ |
| 7 | Exposure adjustment setting display screen | Setting completed | — | dSV − ⅓ | DSV + ⅓ |

In FIG. 16, SM1 indicates that the state register M0 shown in Table 2 is 0. When the state register M0=0, the first display is displaying the execution screen, which has all the possible selection branches. In this state, each of the four display blocks 311–314 displays an icon that corresponds to one of the four modes of mode register M1. The display block 311 displays a camera icon and "AUTO" letters, which correspond to the automatic mode P0. The display block 312 displays a mountain icon, which corresponds to the scenery mode P1. The display block 313 displays a profile icon, which corresponds to the portrait mode P2, and the display block 314 displays a flower icon, which corresponds to the close up mode P3. Any of the four modes may be selected as the selection branch. To indicate that a selection is possible, the triangle segment 34a–34f of the auxiliary display section 34 above each icon is flashed. In addition, the number of film pieces is displayed in segment display sections 32 and 33 as two numerical digits.

Each of display screen SM2 through SM5 in FIG. 16 is a second display. The second display is selected in response to pushing one of the switches SW2–SW6. Each switch SW2–SW6 corresponds to one of the display blocks 311–314 in the first display. In other words, SM2 is the display screen of the second display when the automatic display panel 30. Therefore, the photographer can proceed to take the desired picture without further selections, and the picture taking process completes without any mode changes. However, a mode change, when desired, is performed by simply pushing the switch SW2. In response to the switch SW2 being ON, the control unit 10 returns to the display screen of the first display AM1 shown in FIG. 17.

The display screen AM1 displays on dot matrix display component 310 a letter for each selection branch. "P" is displayed for the program mode P; "S" is displayed for the shutter priority modes; "A" is displayed for the aperture priority mode A; and "M" is displayed for the manual mode. To indicate that these selection branches can be selected, the triangle segments 34a–34f of the auxiliary display section 34 are flashed. The photographer can select one of the above modes.

If the photographer continuously pushes the switch SW2 for more than a specified period of time, a default jump occurs. The control unit 10 responds by displaying the display screen AM2 shown in FIG. 18. However, if the photographer had preselected and stored into the RAM 103 a desired mode, shown by the broken lined display screen next to display screen AM2, the control unit 10 responds to the default jump by changing the mode register M1 to the mode stored in the RAM 103. The display screen corresponding to the stored mode is then displayed. If a desired mode was not stored in the RAM 103, the control unit 10 changes the mode to the automatic mode.

When the power source is cut off, the contents of the preselected desired mode are saved into the EEPROM 16. During initialization of the power source, the contents of the saved preselected desired mode in the EEPROM 16 are read to the RAM 103. In addition, the current state of the camera just before the power source is cut off is also saved in and retrieved from the EEPROM 16 in the same manner.

If while the display screen AM1 is displayed, the photographer selects one of P, S, A and M, using switches SW3–SW6, the control unit 10 changes to the selected mode and displays the corresponding display screen AM3, AM4, AM5 or AM6, respectively. In each of the selected display screens, the letter of the corresponding mode is displayed on mode display component 37.

For modes corresponding to display screens AM4, AM5 and AM6, the shutter speed and the aperture setting are determined by the control unit 10. No further selection is needed. For the mode corresponding to the display screen AM3, an arrow icon is displayed in display block 314, indicating that the display screen contains more selection branches beyond the right-most side of dot matrix display component 310. If the switch SW6 corresponding to the arrow icon is pushed, the control unit 10 displays additional selection branches by displaying the next display screen AM7. Furthermore, if the switch SW6 is pushed again while the display screen AM7 is displayed, the control unit 10 displays further additional selection branches by displaying still another display screen AM8. While the display screen AM8 is displayed and the switch SW3 is pushed, the control unit 10 re-displays the previous display screen AM7. When the switch SW3 is pushed again, the control unit 10 redisplays the second previous display screen AM3. Of course, the arrow icon can be replaced by another icon in each display screen AM3, AM7 and AM8. The display screens AM2 and AM9–AM15 correspond to modes P0–P7 being set in the mode register M1. Each of these modes is selected by pushing the switch that is directly above the display block 311–314 displaying the corresponding icon.

If the switch SW2 is depressed while the display screen AM1 is displayed, the control unit 10 changes to one of two function input display screens AM16 or AM17. The control unit 10 displays the display screen AM16 if the photographer has not registered a desired mode. After the photographer completes the desired mode registration, the control unit 10 flashes the "MEM" display component 36 and changes to function input display screen AM17. If while in the function input display screen AM17, the switch SW3, corresponding to display block 311, is pushed, all registered modes up to that point are cleared, and the control unit 10 changes to the function input display screen AM16. The display screen flashing AM17 is identical to the display screen AM16, except for the "MEM" display component 36 and the clear icon displayed on display block 311.

The memory registration of a desired mode is accepted while the display screen AM16 is displayed. When the switch SW3, corresponding to the display block 311, is pushed, the control unit 10 changes the display to the display screen AM22 shown in FIG. 18 (the connection between FIG. 17 and FIG. 18 is indicated by *). While the display screen AM16 is displayed and one of the display blocks 312–314 is selected by pushing one of the switches SW4–SW6, respectively, the control unit 10 changes the display to one of the display screens AM18, AM19, AM20 and AM21. These are the display screens used to input parameters.

Pushing the switch SW4, corresponding to the display block 312, causes the display screen AM18 to be displayed. The display screen AM18 displays the selection parameters of one of the single mode S and the continuous mode C at the time of AF (automatic focus). Pushing the switch SW5, corresponding to the display block 313, causes either the display screen AM19 or AM20 to be displayed depending on whether the film sensitivity setting DX can be read. If the film sensitivity setting DX can be read, then the display screen AM19 is displayed; otherwise, the display screen AM20 is displayed to allow setting the film sensitivity manually. Pushing the switch SW6, corresponding to display block 314, causes the display screen AM21 to be displayed. The display screen AM21 allows the exposure adjustment to be made.

For the display screens AM18, AM20 and AM21, the input parameters are set by pushing switches SW5 or SW6. For the display screen AM18, the switch SW5 selects the single mode indicated by the character "S" displayed in the display block 313, and the switch SW6 selects the continuous mode indicated by the character "C" displayed in the display block 314. For the display screens AM20 and AM21, the switch SW5 decreases the value displayed by the display blocks 313 and 314 while the switch SW6 increases the value. The auxiliary display component 34 displays a triangle segment 34e pointing downward just below the switch SW5 and a triangle segment 34f pointing upward just below the switch SW6 to indicate the direction of value change associated with each respective switch.

After the parameter setting operation is completed, the parameter value is stored in the RAM 103 by pushing the switch SW3, which corresponds to the display block displaying the icon for each function. The parameter value entered is maintained for subsequent operations unless further changes are made. These values are saved in the EEPROM 16 when the power source is cut off.

FIG. 18 shows the display screen AM22 for the selection of a desired mode to be registered. The display screen AM22 is the same as the display screen AM1 except that memory mode display component 36 is flashing. The desired mode selection to be registered is performed in the identical manner as the mode selection process described for FIG. 17. In other words, one of the "P", "S", "A" or "M" is selected by pushing one of the switches SW3–SW6, respectively, and the mode corresponding to the displayed display screen is registered by pushing the switch corresponding to the flashing triangle segment of the auxiliary display component 34. For example, if while the display screen AM22 is displayed, the triangle segment 34a of the auxiliary display component 34 is flashing and the switch SW3 is pushed, the automatic mode is registered. The same is true for other modes.

After the desired mode is registered, the control unit 10 changes to the exposure mode immediately before the registration operation is completed. If the switch SW2 is continuously pushed while the display screen AM22 is displayed, the control unit 10 displays the display screen AM24, and the registration is completed. If the switch SW2 is continuously pushed while the display screen AM22 is displayed and a desired mode has not been registered, then the control unit 10 changes to the automatic mode and displays the display screen AM25.

Figure 8:
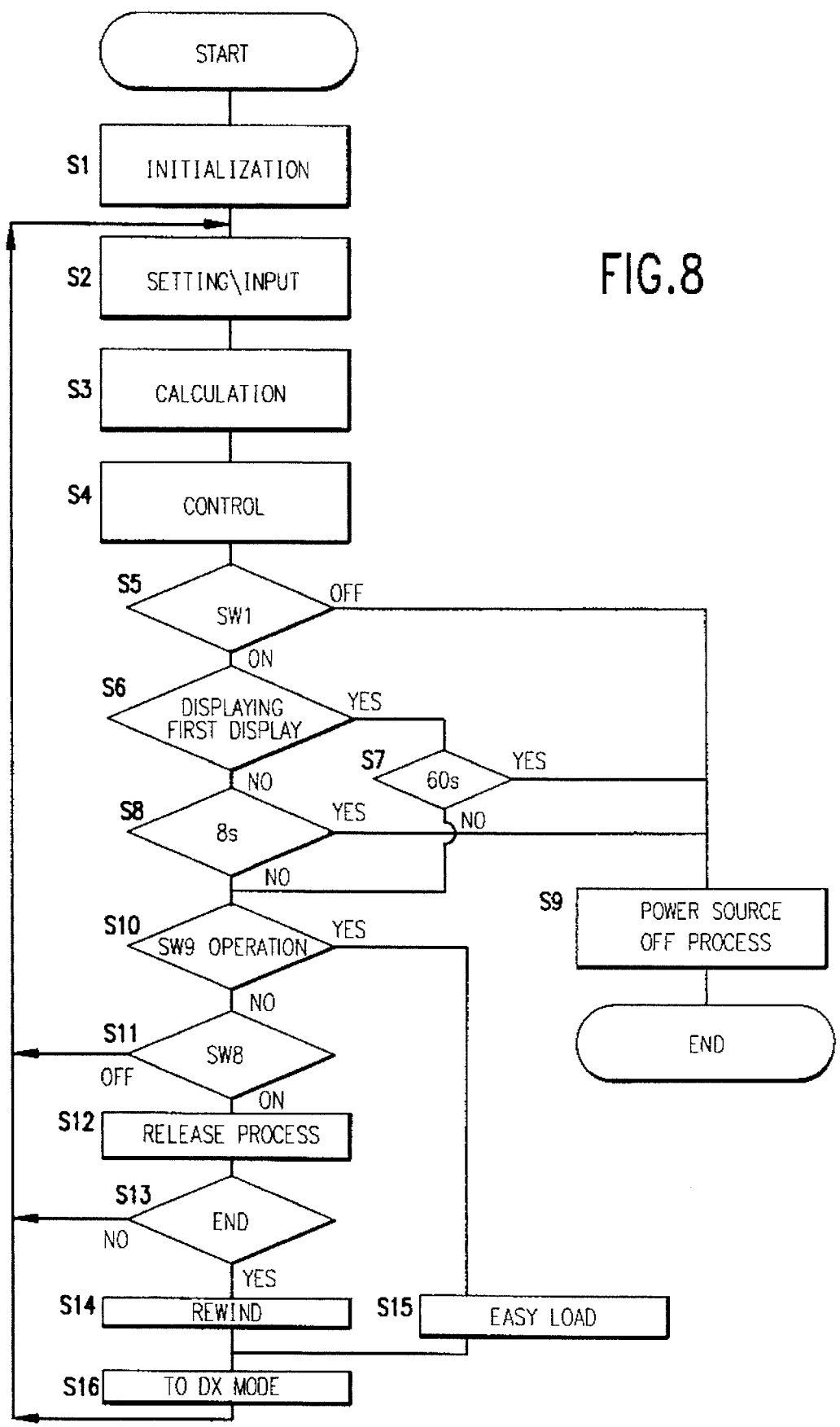
FIG. 8 is a flow chart of a main routine of a unit that controls the camera.

FIG. 8 is a flow chart depicting a main routine of the control unit 10. Before any switches are pushed, the control unit 10 is in a stand-by mode that consumes a very small amount of energy. When either the switch SW2 or SW7 is pushed, the control unit 10 is interrupted from the stand-by mode, and the initialization process of step S1 is started.

In step S1, the initialization of the control unit 10 is accomplished. This includes setting the power source circuit 11 to ON, supplying power to all the circuits, and setting a clock 104 of the control unit 10 to ON. Data is read from the EEPROM 16 and transferred to the RAM 103 of the control unit 10.

In step S2, the switch for controlling the input to the control unit 10 is activated, and the setting operation is accomplished. The output from the photometric circuit 12, the telemetric circuit 13, and the DX contact point 14 are input and stored in the RAM 103 of the control unit 10.

In addition, a power source check is performed. Based on the power source check, a warning may be issued if, for example, the battery voltage is below a designated value. This warning can be displayed on the display panel 30 using the characters shown in FIG. 7. For example, the patterns at the addresses "DC" and "DD" and the addresses "D6" and "D7" can be used. In some cases, it is possible to prohibit the shutter release.

In step S3, the exposure or distance calculation is performed based on the data from the RAM 103 obtained in step S2. Additionally, when the output from the photometric circuit 12 indicates low light conditions, a warning can be issued for the use of a flash.

In step S4, the AF controlling the first motor control device 17, the display controller driving the display device in the finder display unit 15 or LCD driver 20 complete their respective tasks.

In step S5, the control unit 10 determines whether the switch SW1 is ON or OFF. When the switch SW1 is ON, the operation of the control unit 10 proceeds to step S6. When the switch SW1 is OFF, the operation of the control unit 10 proceeds to step S9.

In step S6, the control unit 10 determines if the display screen displayed on the display panel 30 is a first display or a second display. If the display screen is a first display, then a specified timer value is set to 60 seconds and the control unit 10 proceeds to step S7. Otherwise, the control unit 10 sets the specified timer value to eight seconds and continues to step S8. In steps S7 or S8, the control unit 10 checks if any of the switches SW2–SW7 has been pushed. This is a setting operation check. A setting operation pending flag indicates that one of the switches SW2–SW7 has been pushed, and a setting operation is pending. In step S7 or S8, the control unit 10 determines whether the power source maintenance timer has exceeded the specified timer value. As long as one of the switches SW2–SW7 is not pushed, the power source maintenance timer continues to count time. When the power source maintenance timer count exceeds the specified timer value, the control unit 10 proceeds to step S9. However, if one of the switches SW2–SW7 was pushed and set to ON, the power source maintenance timer is cleared, and the control unit 10 proceeds to step S10.

In step S7, the specified timer value is set to 60 seconds. The power source maintenance timer is set to 60 seconds to prevent the power source from turning OFF during the setting operation. In step S8, the specified timer value is set to eight seconds. The power source maintenance timer is set to eight seconds during the second display because less time is required to confirm the selected camera mode or to set picture taking parameters once the camera mode is selected. Thus, setting the power source maintenance timer to eight seconds for the second display prevents unnecessary consumption of energy and saves electric power.

The time allowed for the switches SW2–SW7 operations is shortened for setting parameters after a mode selection is made by selecting a selection branch. The time for the setting operation for selecting selection branches takes longer, and thus, a longer time is set. This is especially true for a photographer who is unfamiliar with the camera. Once the photographer becomes familiar with the camera, selecting a camera mode by selecting a selection branch using the first display can be completed quickly. Thus, even though the specified timer value of the timer is set to the larger value of 60 seconds, the timer will be reset quickly, and the control unit 10 will proceed to the second display where the specified timer value is only eight seconds. Therefore, the longer time is provided for a photographer who is unfamiliar with the camera while not unnecessarily consuming power for a photographer who is familiar with the camera.

In step S9, the data stored in the RAM 103 is saved in the EEPROM 16 after the power source is cut off. The power source control circuit 11 then turns OFF completion of the power source OFF process.

In step S10, the back cover switch SW9 is checked. When the back cover is closed, the back cover switch SW9 is ON, and the start up operation begins by the control unit 10 proceeding to step S15 performing the automatic film installation function. The switch SW9 is OFF when the back cover is open. If either the switch SW9 is OFF or the automatic film installation function is completed, the control unit 10 proceeds to S11.

In step S11, the ON-OFF mode of the shutter release switch SW8 is checked. If the switch SW8 is OFF, the control unit 10 returns to step S2, and the process is repeated. If the switch SW8 is ON, the operation of the control unit 10 proceeds to step S12. In step S12, the shutter release process is performed by activating the second motor control circuit 18 or by activating the exposure control circuit 19.

In step S13, the film supply is checked. When one frame of the film is not wound, the film is considered to be at the end, and the control unit 10 proceeds to step S14 to perform the rewinding operation. When the winding of one frame of the film is possible, the film is not at the end, and the control unit 10 returns to step S2. In step S14, the rewinding operation is performed by using a supply mechanism (not shown) and by activating the second motor control circuit 18. When the rewinding operation is completed, the control unit 10 proceeds to step S16.

In step S15, a designated quantity of film is wound by activating the second motor driving device, thus completing the automatic film installation. Upon completion, the control unit 10 proceeds to step S16.

In step S16, the manual ISO setting is cleared, and a switch over to the DX mode is completed. After the manual ISO setting is cleared, manual setting of the film sensitivity cannot be performed. When the switch over to the DX mode is made, the initial value of the film sensitivity is set to ISO 100, the most standard sensitivity. However, if the initial value of the film sensitivity is not valid, the control unit 10 displays the initial value in display screen AM20 for manual setting. After the manual setting operation is completed, the control unit 10 returns step S2 and the process is then repeated.

Figure 9:
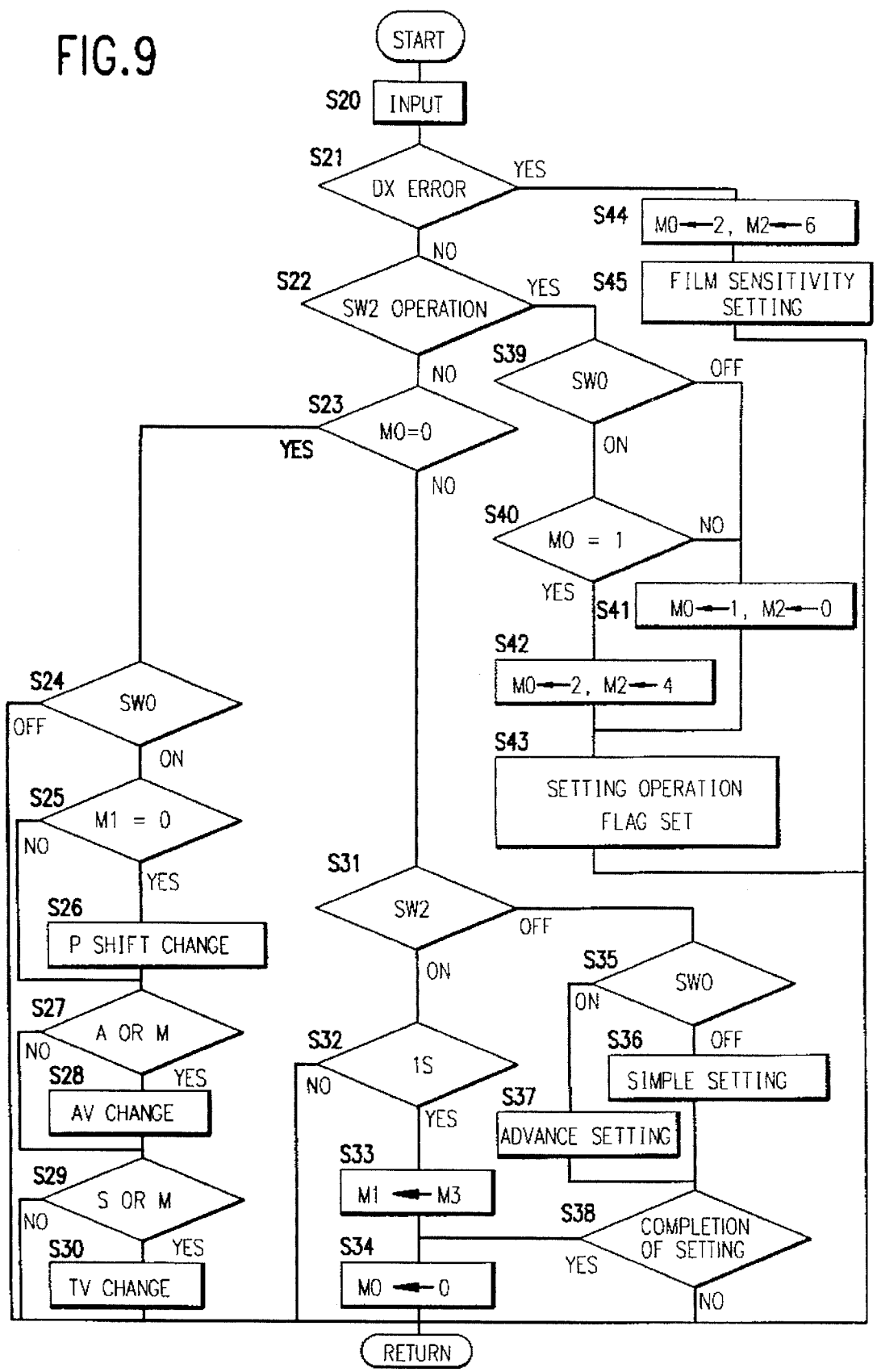
FIG. 9 is a flow chart of a setting process routine performed by the control unit to set camera parameters.

FIG. 9 depicts a part of the setting operation subroutine when the setting and input operations of step S2 in FIG. 8 are performed. In step S20, if the input of the switches SW2–SW7 are received and one of the switches is set to ON, the power source maintenance timer, checked at step S7 or step S8 of FIG. 8, is cleared. In step S21, the film sensitivity data is read from the conductor section of the film from the DX contact point 14. A DX error is also checked. When the DX contact point 14 determines that the film is not the DX film, a DX error flag is set, and the control unit 10 proceeds to step S44. When the DX contact point 14 detects a DX film, the control unit 10 proceeds to step S22.

Figure 11:
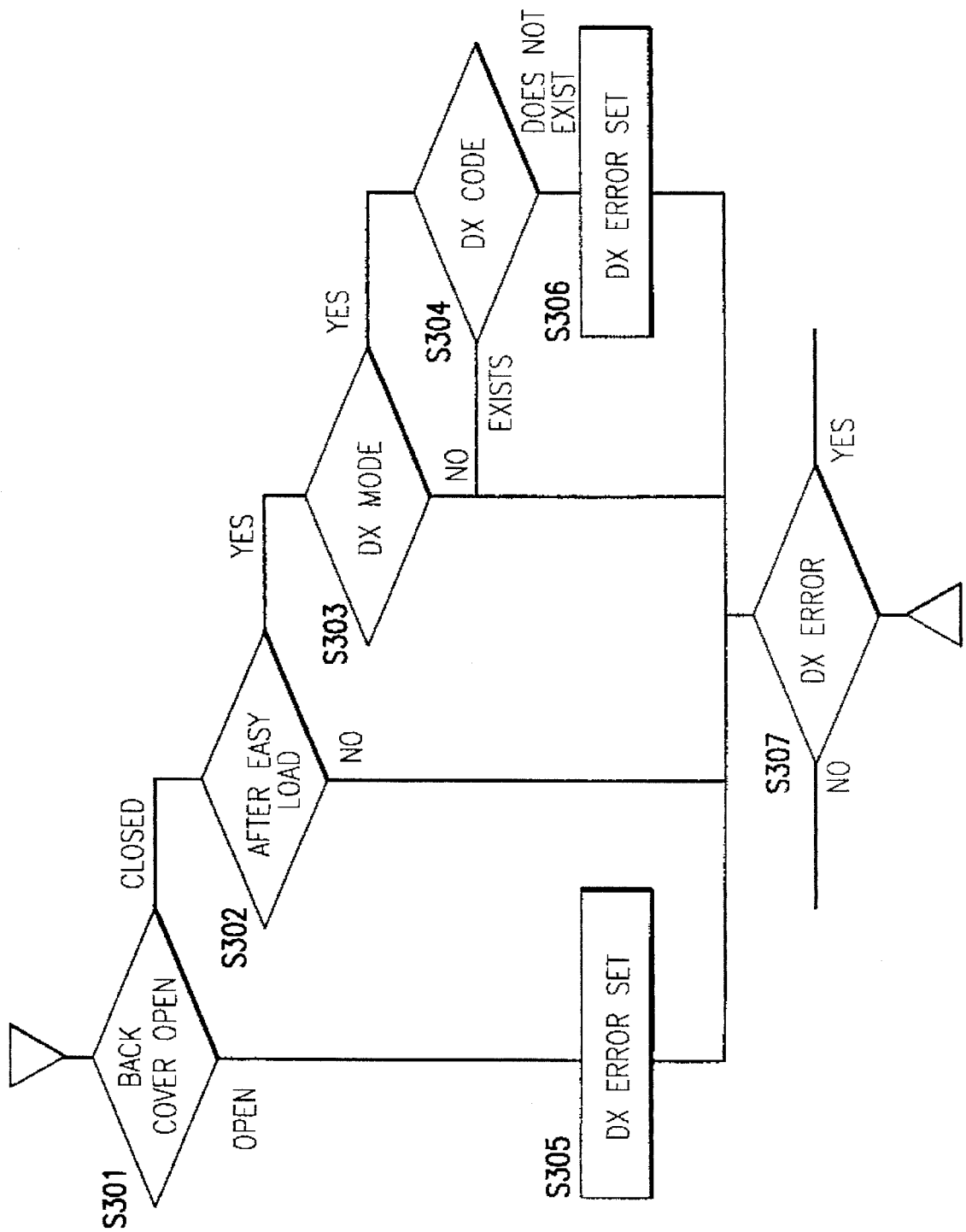
FIG. 11 is a flow chart of a DX error routine for determining whether a film loaded in the camera is a DX film.

The detection of the film in step S21 is performed by the flowchart shown in FIG. 11. Initially, the open/close state of the back cover is checked in step S301. In step S302, the automatic film installation is performed, and the existence of the film is checked. In step S303, the DX mode is checked. If the film sensitivity is switched over to the manual setting, a warning is not issued. In step S304, the film sensitivity data is read from DX contact point 14. When the DX film is not present, all of the DX contact point 14 terminals are set at high level. When the DX film is present, the data in accordance with the DX code can be read. In addition, if the DX input is determined to be invalid DX codes, the DX error flag is set and is reset when the back cover is opened.

In step S22, the operation of switch SW2 is checked. If the switch SW2 is set to ON, the control unit 10 proceeds to step S39. When the switch SW2 is set to OFF or the switch SW2 is continuously pushed, the control unit 10 proceeds to step S23. In step S23, the state register M0 is checked. If the state register M0 is 0 (the non-selection mode), the control unit 10 proceeds to step S24. If the state register M0 is 1 or 2 (the selection mode), the control unit 10 proceeds to S31.

In step S24, the switch SW0 is checked. If the switch SW0 is set to ON, indicating the advanced mode, the control unit 10 proceeds to step S25. If the switch SW0 is set to OFF, indicating the simple mode, the control unit 10 returns to the flow chart depicted in FIG. 8. In other words, nothing is processed in the execution screen for the simple mode.

In step S25, the automatic mode is checked. If the control unit 10 is in the automatic mode and the mode register M1=0, the control unit 10 proceeds to step S26. Otherwise, the control unit 10 proceeds to step S27.

In step S26, the setting of the program shift quantity is performed. The program shift quantity is, for example, a combination of the preset aperture and the shutter speed. If the mode register M1=0, as shown in Table 5, the program shift quantity is reduced by ½ step increments by operating the switch SW5. Similarly, the program shift quantity is increased by ½ step increments by operating SW6. The control unit 10 proceeds to step S27.

In step S27, the control unit 10 determines whether the aperture priority mode A or manual mode M is selected. When the mode register M1≧9 (A mode or M mode), the control unit 10 proceeds to step S28. On the other hand, when the mode register M1≦9 (program mode P or shutter priority mode S), the control unit 10 proceeds to step S29.

In step S28, the aperture value AV is changed. When the mode register M1 is 9 or 10, as shown in Table 5, the aperture value AV setting is decreased by ½ step increments by operating the switch SW5. The aperture value AV setting is increased in ½ step increments by operating the switch SW6.

In step S29, if either the S mode or M mode is selected (M1=8 or M1=10, respectively), the control unit 10 proceeds to step S30. If either the P mode or A mode (M1=7 or M1=9, respectively) is selected, the control unit 10 returns to the flow chart depicted in FIG. 8.

In step S30, the shutter speed TV value is changed. When the mode register M1 is 8 or 10, as shown in Table 5, the shutter speed TV setting is decreased in ½ step increments by operating the switch SW3. The shutter speed TV setting is increased by ½ step increments by operating the switch SW6.

In step S31, the switch SW2 is checked. If the switch SW2 is set to ON, the control unit 10 proceeds to step S32. If the switch SW2 is set to OFF, the control unit 10 proceeds to step S35. In step S32, the control unit determines whether more than one second has passed. When switch SW2 is pushed for more than one second, the control unit 10 proceeds to step S33. If the switch SW2 is pushed less than one second, the control unit 10 returns to the flow chart depicted in FIG. 8.

In step S33, the mode setting data stored in the mode register M3 are transferred to the mode register M1. If nothing is stored in the mode register M3, the initial value of 0 is transferred, and the control unit 10 is set to the automatic mode PO. If a desired mode has been set, the mode is set to the desired mode by reading the mode data from the mode register M3, and the control unit 10 proceeds to S34. In step S34, the state register M0 is set to 0, and the control unit 10 returns the flow chart depicted in FIG. 8.

In step S35, the switch SW0 is checked. If the switch SW0 is ON (the advanced mode), the control unit 10 proceeds to step S37. If the switch SW0 is OFF (the simple mode), the control unit 10 proceeds to step S36.

In step S36, the simple mode (M1=0–3) is selected. When the switch SW3 is ON, a 0 is stored in the mode register M1, and the control unit 10 sets the mode to the automatic mode. When the switch SW4 is ON, a 1 is stored in the mode register M1, and the control unit 10 sets the mode to the scenery mode. When the switch SW6 is ON, a 3 is stored in the mode register M1, and the control unit sets the mode to the close up mode. When no setting operation is performed and the flag indicating that the setting operation is not complete is set, the control unit proceeds to step S38.

Figure 12:
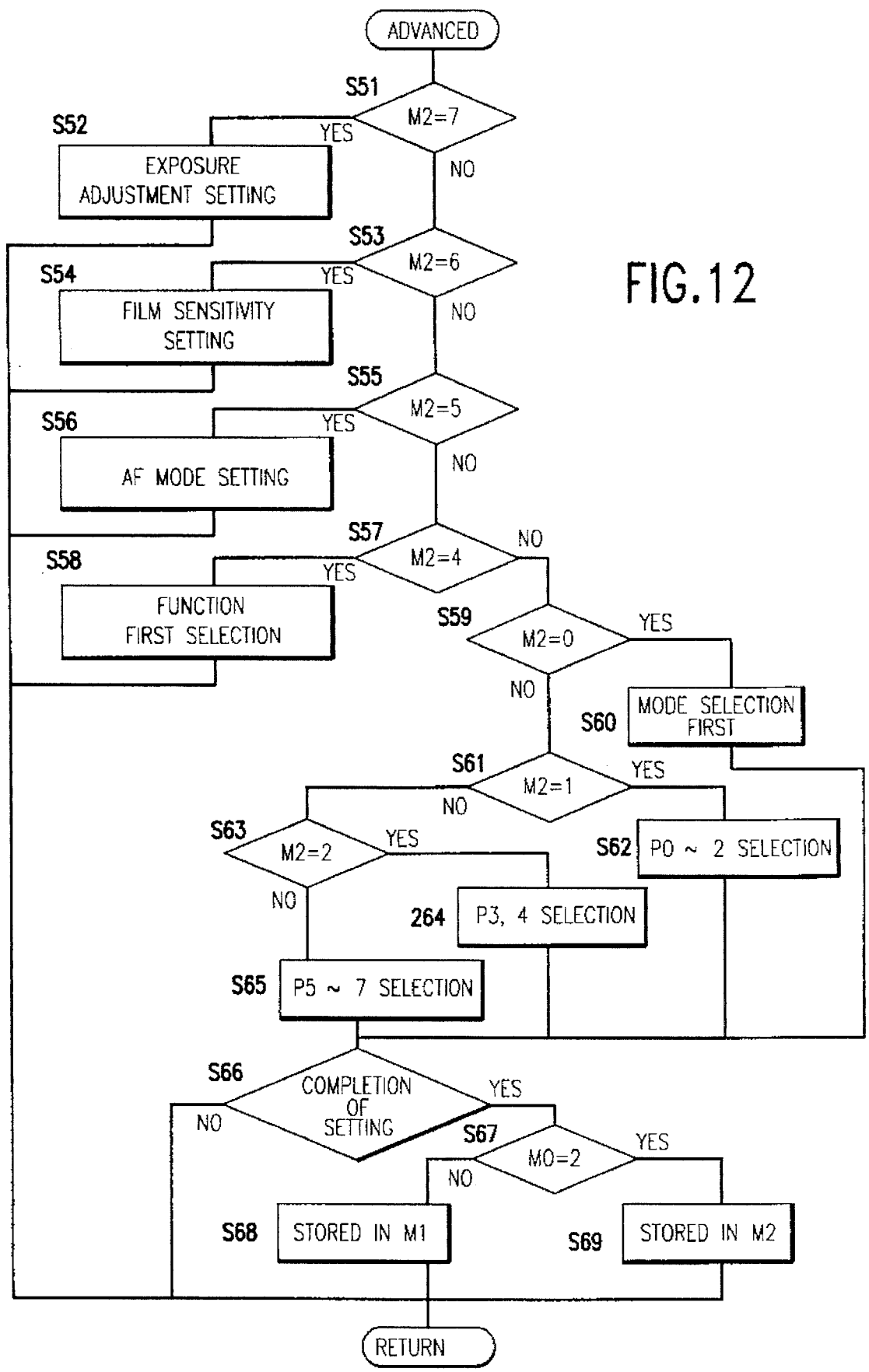
FIG. 12 is a flow chart of an advanced mode setting routine for setting parameters for the advanced mode operation of the camera.

In step S37, the control unit 10 performs the subroutine for the advanced mode, shown in FIG. 12, allowing the photographer to select the advanced modes shown in Table 7. The setting is accomplished using the switches SW3–SW6. When any setting operation is performed, the setting operation pending flag is reset. When no setting operation is performed, the control unit 10 proceeds to step S38 without resetting the setting operation pending flag. In step S38, the setting operation is checked. When the setting operation pending flag is set (i.e., no mode has been set), the operation of the control unit 10 returns to the flow chart of FIG. 8. If the setting operation pending flag is reset (i.e., a mode has been set), the control unit 10 proceeds to step S34.

In step S39, the switch SW0 is checked. If switch SW0 is ON (the advanced mode), the control unit 10 proceeds to step S40. If switch SW0 is OFF (the simple mode), the control unit 10 proceeds to step S41. In step S41, the state register M0 is set at 1 and the register M2 is set at 0, and the control unit 10 proceeds to step S43. When the advanced mode is selected (SW0 is ON), the control unit 10 proceeds to step S40. At step S40, the state register M0 is set to 1, and the control unit 10 proceeds to step S42. In step S42, the state register M0 is set to 2, the mode register M1 is set to 4, and the control unit 10 proceeds to step S43. In step S40, if the state register M0 is set to 0, the control unit proceeds to S41. In step S41, the state register M0 is set to 1, the screen register M2 is set to 0, and the control unit 10 proceeds to step S43.

In step S43, the flag indicating that the setting operation is pending is set, and the control unit 10 returns to the flow chart depicted in FIG. 8. In the simple mode, the state register M0 is always set to 1 regardless of whether the menu button SW2 is ON. In the advanced mode, if the menu button SW2 is ON, the state register M0 is changed from 1 to 2, and the selection mode, shown in Table 2, is replaced with the function selection mode. In either case, the setting operation pending flag is set. At this time, if the menu button SW2 is pushed even though the execution screen is displayed, a display screen for the setting operation is displayed. In addition, if the control unit 10 proceeded to step S34 from step S33, or if the control unit 10 proceeds to step S34 after the setting operation is completed, a default jump causes the state register M0 to be switched to 0. Thus, the display screen is changed to the execution screen.

In step S44, the state register M0 is set to 2, and the screen register M2 is set to 6. In step S45, the film sensitivity setting subroutine is performed.

Figure 10:
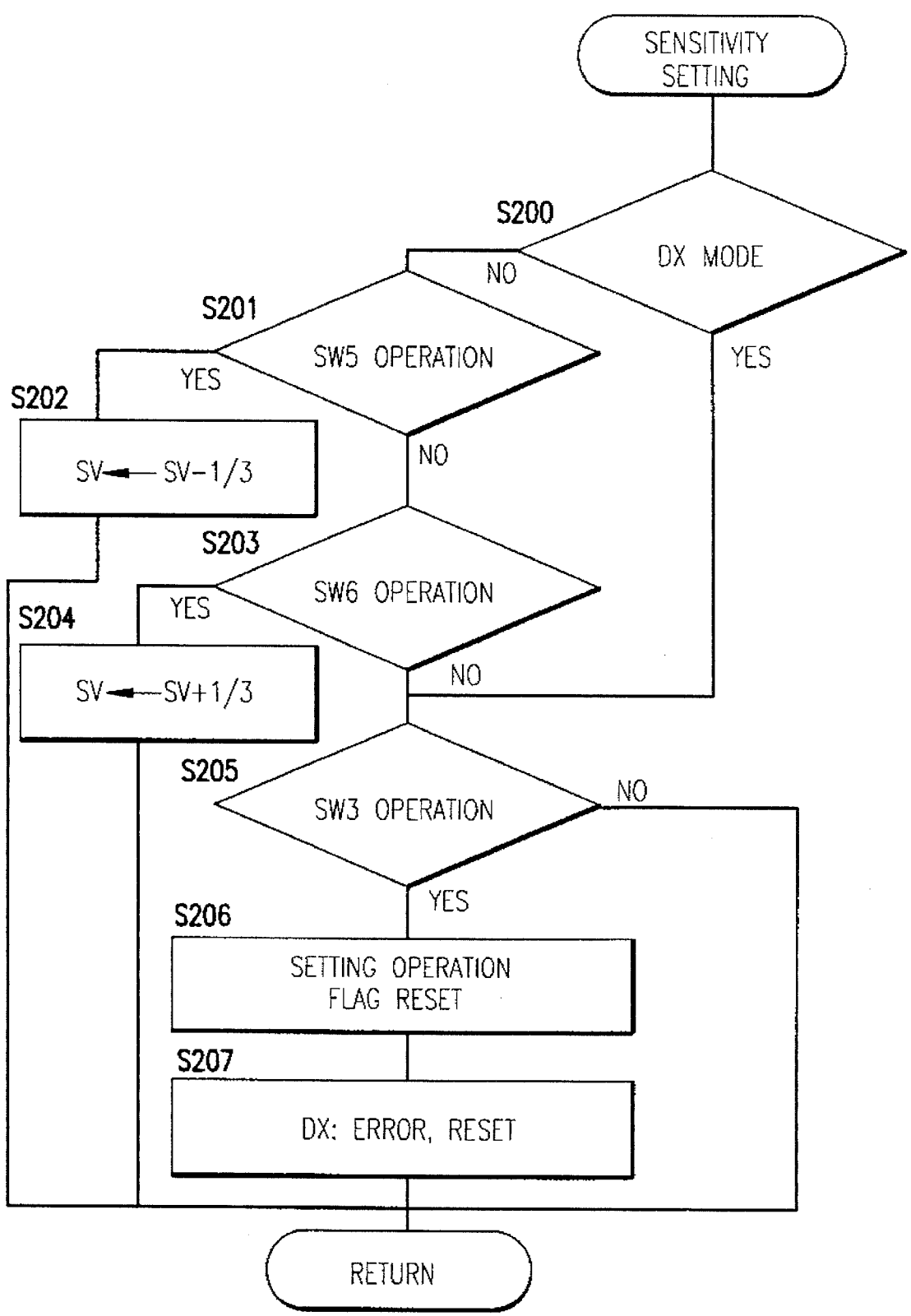
FIG. 10 is a flow chart of a film sensitivity setting process routine for setting the film sensitivity parameters.

FIG. 10 is a flow chart of the film sensitivity setting subroutine. In step S200, DX mode is checked. If DX film is installed (DX mode: Yes), the process proceeds to step S205, making it possible to confirm the setting value only with DX film. If DX film is not installed (DX mode: No), then step S201 is executed. In step S201, the switch SW5 is checked. If switch SW5 is ON, the control unit proceeds to step S202 where the film sensitivity SV is reduced by ⅓ step increments. In step S203, the switch SW6 is checked. If the switch SW6 is ON, the control unit 10 jumps to step S204, and the film sensitivity SV is increased by ⅓ step increments. In step S205, the switch SW3 is checked. If the switch SW3 is ON indicating that the setting operation is completed, the control unit 10 jumps to step S206 and resets the setting operation pending flag. In step S207, the DX error flag is reset. The control unit 10 returns from the subroutine shown in FIG. 10 to the subroutine shown in FIG. 9 at step S45 and returns to step S3 of the flow chart shown in FIG. 8.

If a DX error is detected, the control unit 10 proceeds to steps S44 and S45. The state register M0 is set to 2, and the screen register M2 is set to 6, which switches the display to the film sensitivity setting screen where the film sensitivity can be set manually. When the manual film sensitivity setting is completed, the DX error flag is reset. The control unit 10 then proceeds through steps S22, S23, S31, S35, S36 or S37, S38 and S34 completing the setting operation.

FIG. 12 depicts the subroutine of the advanced mode setting routine of step S37, shown in FIG. 9. The selections shown in Table 7 are performed with switches SW3–SW6. In step S51, the control unit 10 determines whether the screen register M2 is set to 7. If the screen register M2 is set to 7 and the exposure adjustment setting screen is displayed, the control unit 10 proceeds to step S52. Otherwise, the control unit 10 proceeds to step S53.

In step S52, the exposure adjustment setting (M2=7 row of Table 7) is performed. When the switch SW5 is ON, the exposure adjustment quantity DSV is reduced by ⅓ step increments. When the switch SW6 is ON, the exposure adjustment quantity DSV is increased by ⅓ step increments. When the switch SW3 is ON, the control unit 10 determines that the setting operation is completed, and the setting operation pending flag is reset. The control unit 10 does not respond to the switch SW4. If any setting operation is incomplete or an invalid switch is pushed, the control unit 10 returns to the flow chart depicted in FIG. 9, and the setting operation pending flag remains set.

In step S53, the control unit 10 determines whether the screen register M2 is set to 6. If the screen register M2 is set to 6, the display panel 30 displays the film sensitivity setting screen, and the control unit 10 proceeds to step S54. Otherwise, the control unit 10 proceeds to step S55.

In step S54, the film sensitivity setting (M2=6 row of Table 7) is performed. The film sensitivity is set in the same manner as in step S45 of FIG. 9 where the film sensitivity setting subroutine of FIG. 10 is performed. The control unit 10 will respond to the switches SW3, SW5 and SW6. However, the control unit 10 will not respond to the switch SW4. If any setting operation is incomplete, or an invalid switch is pushed, the control unit 10 returns to the flow chart depicted in FIG. 9, and the setting operation pending flag remains set.

In step S55, the control unit 10 determines whether the screen register M2 is set to 5. If the screen register M2 is set to 5 and the AF mode setting screen AM18 is displayed, the control unit 10 proceeds to step S56. In all other cases, the control unit 10 proceeds to step S57. In step S56, the setting of the AF mode (M2=5 row of Table 7) is performed with the switches SW5 and SW6. When the switch SW5 is ON, AF-S (single mode) is set. When the switch SW6 is ON, AF-C (continuous mode) is set. In either case, the setting is complete, and the setting operation pending flag is reset. The control unit 10 does not respond to the switches SW3 or SW4. If any setting operation is incomplete or an invalid switch is pushed, the control unit 10 returns to step S37 of FIG. 9, and the setting operation pending flag remains set.

In step S57, the control unit 10 determines whether the screen register M2 is set to 4. If the screen register M2 is set to 4 and the first function selection screen is displayed, the control unit 10 proceeds to step S58. In all other cases, the control unit 10 proceeds to step S59.

In step S58, the first function selection (M2=4 row of Table 7) is performed. If the switch SW3 is ON, and a desired mode has not been set, the screen register M2 is set to 0. The display is changed to the mode selection display screen AM16. On the other hand, if a desired mode has been set, the screen register M2 is at 4 and the contents of the mode register M3 should be cleared. If the default jump is made, as shown in Table 3, the desired mode becomes the automatic mode. If the switch SW4 is ON, the screen register M2 is set to 5, and the control unit 10 displays the AF mode setting screen on the display panel 30. If the switch SW5 is ON, the screen register M2 is set to 6, and the film sensitivity setting screen is displayed. If the switch SW6 is ON, the screen register M2 is set to 7, and the exposure adjustment quantity setting screen is displayed. If any other type of switch operation is detected, the control unit 10 assumes that the setting operation is completed, and the setting operation pending flag is reset. If no setting operation is performed, the control unit 10 returns to step S37 of FIG. 9, and the setting operation pending flag remains set.

In step S59, the control unit 10 determines whether the screen register M2 is set to 0. If the screen register M2 is set to 0, the mode selection first screen AM22 is displayed, and the control unit 10 proceeds to step S60. In all other cases, the control unit 10 proceeds to step S61.

In step S60, the setting of the first mode selection screen (M2=row 0 of Table 7) is performed. If the switch SW3 is ON, the screen register M2 is set to 1, and the control unit 10 is set to the program modes P0–P2. If the switch SW4 is ON, row 8 of Table 3B is set into a saving register X, and the selection of the shutter priority mode S is stored in the RAM 103. If the switch SW5 is ON, 9 of Table 3B is set into the saving register X, and the selection of the aperture priority mode A is stored in the RAM 103. When the switch SW6 is ON, row 10 of Table 3 is set into the saving register X, and the selection of the manual mode M is stored in the RAM 103. If any one of switches SW4–SW6 is ON, the control unit 10 assumes that the setting operation is completed, and the setting operation pending flag is reset. If any setting operation is incomplete, the control unit 10 proceeds to step S66, and the setting operation pending flag remains set. The saving register X can function as a buffer memory to store the data memory temporarily. For example, the saving register X can be a location in the RAM 103 or it can be a separate register included in the CPU 101.

In step S61, the control unit 10 determines whether the screen register M2 is set to 1. If the screen register M2 is set to 1 and one of the program mode P0–P2 selection screens are displayed, the control unit 10 proceeds to step S62. In all other cases, the control unit 10 proceeds to step S63.

In step S62, the setting of the program modes P0–P2 (M2=row 1 of Table 7) is performed. When the switch SW3 is ON, row 0 of Table 3B is stored in the saving register X, and the selection of the automatic mode P0 is stored in the RAM 103. When the switch SW4 is ON, row 1 of Table 3 is stored in the saving register X, and the selection of the scenery mode P1 is stored in the RAM 103. If the switch SW5 is ON, row 2 of Table 3B is stored in the saving register X, and the selection of the portrait mode P2 is stored in the RAM 103. If the switch SW6 is ON, the screen register M2 is set to 2, and the screen displays the program mode P3 and P4 selection screen. If the operation of any one of switches SW4–SW5 is detected, the control unit 10 assumes that the setting operation is completed, and the setting operation pending flag is reset. If the switch SW6 is ON, and no setting operation is performed, the operation of the control unit 10 proceeds to step S66, and the setting operation pending flag remains set.

In step S63, the control unit 10 determines whether the screen register M2 is set to 2. If the screen register M2 is set to 2, the program modes P3 and P4 selection screen is displayed. The control unit 10 proceeds to step S64. In all other cases, when the screen register M2 is set to 3, the control unit 10 proceeds to step S65.

In step S64, the setting of the program modes P3 and P4 (M2=row 2 of Table 7) is performed. When the switch SW3 is ON, the screen register M2 is set to 2, and the program modes P3–P4 selection screen is displayed. If the switch SW4 is ON, row 3 of Table 3B is stored in the saving register X, and the selection of the close up mode P3 is stored in the RAM 103. If the switch SW5 is ON, row 4 of Table 3B is stored in the saving register X, and the selection of the sports mode P4 is stored in the RAM 103. If the switch SW6 is ON, the screen register M2 is set to 3, and the program modes P5–P7 selection screen is displayed. When the operation of any one of switches SW4 and SW5 is detected, the control unit 10 assumes that the setting operation is completed, and the setting operation pending flag is reset. In the case that either of switches SW3 and SW6 is ON, and no setting operation is performed, the control unit 10 proceeds to step S66, and the setting operation pending flag remains set.

In step S65, the setting of the program modes P5–P7 (M2=row 3 of Table 7) is performed. If the switch SW3 is ON, the screen register M2 is set to 3, and the program modes P5 and P7 selection screen is displayed. If the switch SW4 is ON, row 5 of Table 3B is stored in the saving register X, and the selection of the night view mode P5 is stored in the RAM 103. If the switch SW5 is ON, row 6 of Table 3B is stored in the saving register X, and the selection of the silhouette mode P6 is stored in the RAM 103. If the switch SW6 is ON, row 7 of Table 3 is stored in the saving register X, and the selection of the inspiration mode P7 is stored in the RAM 103. When the operation of any one of switches SW4 and SW6 is detected, the control unit 10 determines that the setting operation is completed, and the setting operation pending flag is reset. If the switch SW3 is ON and if no setting operation is performed, the control unit 10 proceeds to step S66, and the setting operation pending flag remains set.

In step S66, the control unit 10 determines whether the setting operation is completed. When the setting operation pending flag is set to 1 and the setting operation has not been completed, the control unit 10 returns to step S37 of FIG. 9. In the case that the setting operation pending flag is set to 0, indicating that the setting operation has been completed, the control unit 10 proceeds to step S67.

In step S67, the control unit 10 determines whether the state register M0 is 2. When the state register M0 is 2 and the control unit 10 is in the function selection mode, the control unit 10 proceeds to step S69. If the state register M0 is 1 and the control unit 10 is in the mode selection mode, the control unit 10 proceeds to step S68.

In step S68, the numerical value corresponding to the selected mode stored in the saving register X is transferred to the mode register M1. In step S69, the numerical value corresponding to the selected mode stored in the saving register X is transferred to the mode register M3 for memory. The desired mode is stored in the mode register M3.

At this time, the contents of the mode register M1 are not changed. Therefore, when the display is returned to the execution screen, the states of the control unit 10 have not been changed. In order to make the mode setting valid, the default jump must be performed. The default jump is performed in step S33 and the contents of mode register M3 is transferred into the mode register M1.

Figure 13:
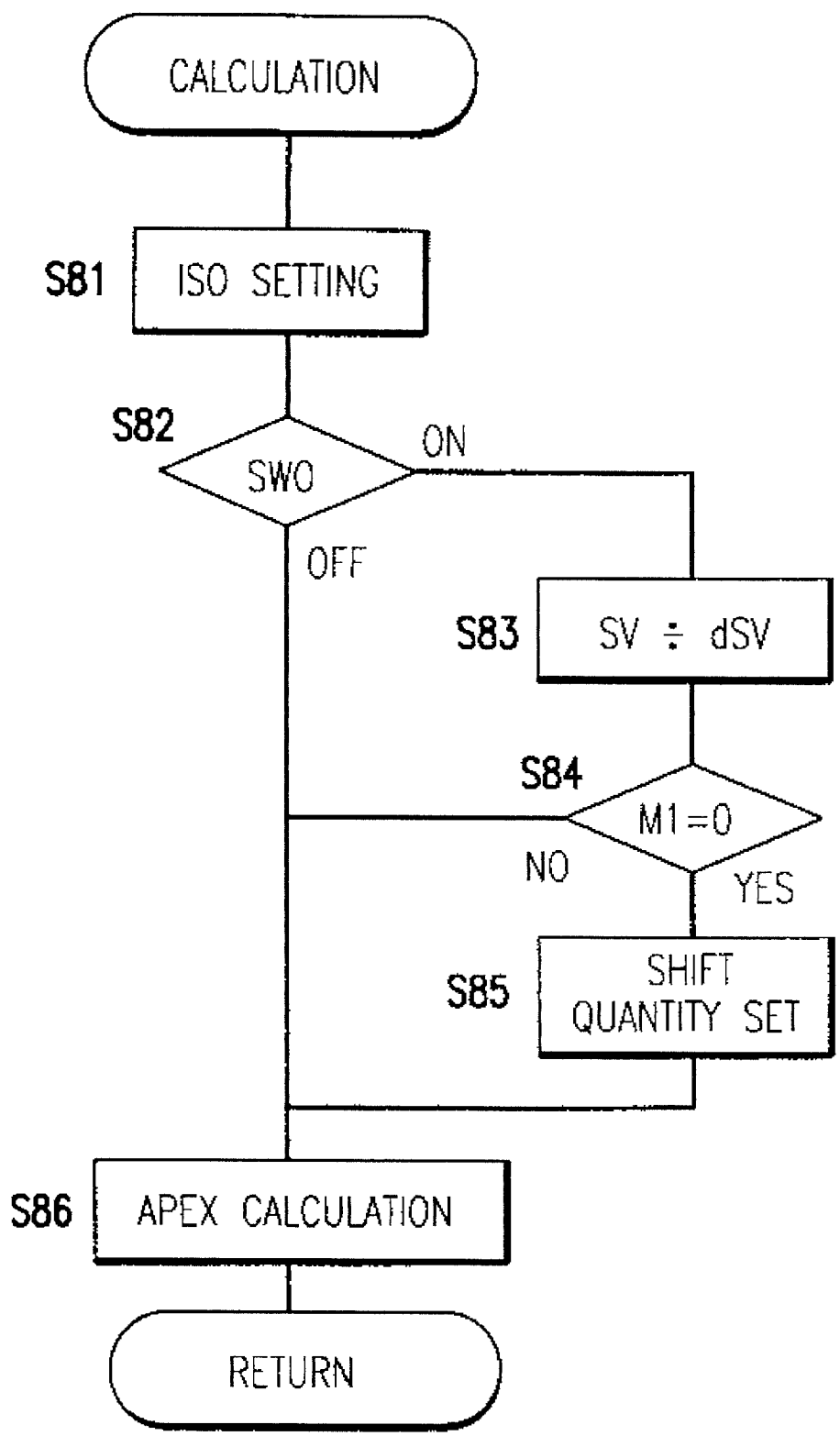
FIG. 13 is a flow chart of an APEX calculation process routine.

FIG. 13 shows the flow chart for the APEX calculation performed during step S3 of FIG. 8. In step S81, the setting of the film sensitivity for APEX calculation is performed. In the case of DX film, the numerical value corresponding to the data read from the DX contact point 14 is set as the film sensitivity. If the film is not a DX film, the film sensitivity is set manually by performing the process of the flow chart shown in FIG. 10.

In step S82, the switch SW0 is checked. If the switch is ON, indicating the advanced mode, the control unit 10 proceeds to step S83. If the switch SW0 is OFF, indicating the simple mode, the control unit 10 proceeds to step S86. In step S83, the exposure adjustment quantity DSV obtained in step S52 of FIG. 12 is subtracted from the film sensitivity SV obtained in step S81. The resulting value is set as the effective film sensitivity.

In step S84, the control unit 10 determines whether the mode register M1 is set to 0. If the mode register M1 is set to 0 in the automatic mode, the operation of the control unit 10 proceeds to step S85. Otherwise, the control unit 10 proceeds to step S86.

In step S85, the program shift quantity is set. The combination of at least the preset aperture and the shutter speed can be changed with this operation. In step S86, the APEX calculation is completed by using the data obtained by the process of steps S81–S85. In the simple mode, the DX setting is followed, and the operation of the camera is not affected by the manual film sensitivity setting or the exposure adjustment results. In the advanced mode, the manual film sensitivity setting or the exposure adjustment setting is valid. In addition, only during the automatic mode under the advanced mode, does program shift become valid.

Figure 14:
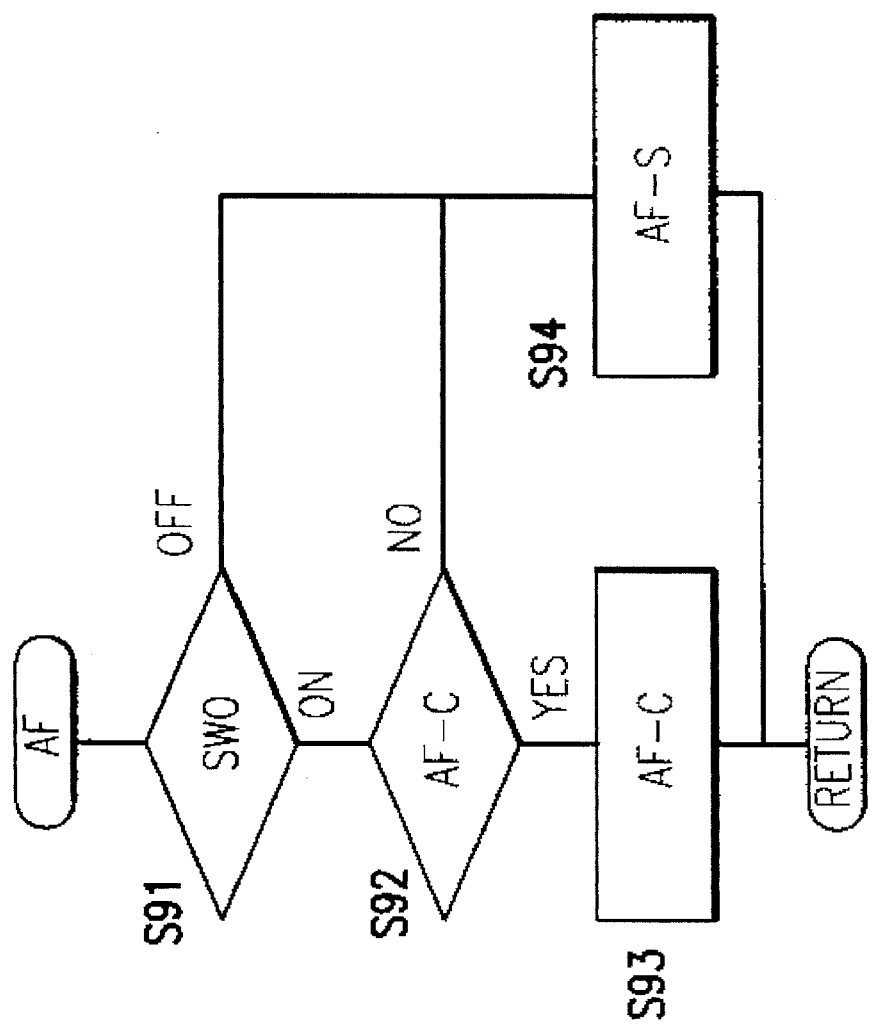
FIG. 14 is a flow chart of the AF control routine.

FIG. 14 shows the AF control flow chart performed by the control unit 10 in step S4 of FIG. 8. In step S91, the switch SW0 is checked. If the switch SW0 is ON indicating the advanced mode, the control unit 10 proceeds to step S92. If the switch SW0 is OFF indicating the simple mode, the control unit 10 proceeds to step S94. In step S92, the AF - C mode is checked. If in step S56 of FIG. 12 the AF - C mode was set, the control unit 10 proceeds to step S93. If the AF - S mode was set, the control unit 10 proceeds to step S94. In step S93, the AF - C mode, the focusing operation is performed as long as the half depression switch SW7 is ON. In step S94, the AF - S mode, the focusing operation is performed once for every time the half depression switch SW7 is switched ON.

In the simple mode, the AF - S mode process is always performed. In the advanced mode, the AF control is performed according to the AF mode set by the function setting.

Figure 15:
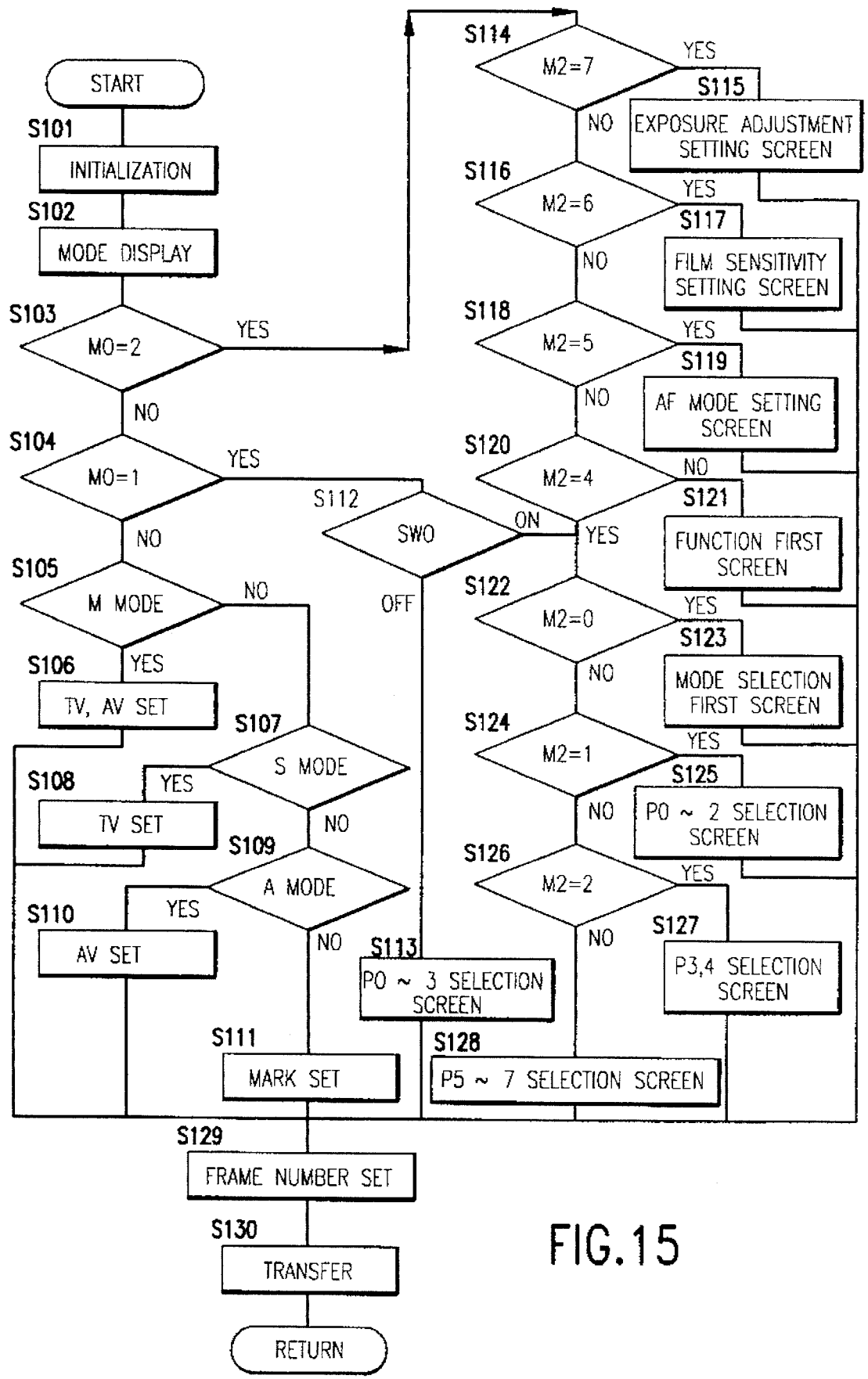

FIG. 15 is a flow chart for the control unit 10 display process performed in step S4 of FIG. 8. In step S101, the memory area for the command data D0–D11 in the buffer memory 22 at the LCD driver 20 is initialized. The pattern at address "20" of the pattern generator memory is a blank display as shown in FIG. 7. The hexadecimal value "20" is set into the command data D0–D7, and the hexadecimal value is set into the command data D8–D11 so that the display blocks 311–314 all display blanks.

In step S102, the data for controlling the segment display components 35–37 are set. To display the exposure control mode, for example, the pattern generator memory address, corresponding to the contents of the mode register in 1, is set into the command data D11. This displays the mode for the execution screen of the advanced mode and the mode selection screen. When the exposure adjustment is set and the adjustment quantity DSV is other than 0, bit 6 of the command data D10 is set to 1, and the corresponding flashing flag is set to flash the segment display component 35 (+/−). When the setting of a desired mode is completed, the bit 7 of command data D10 is set to 1, and the corresponding flashing flag is set to flash the segment display component 36 (MEM). These segments are not flashed in the simple mode.

In step S103, the control unit 10 determines whether the state register M0 is set to 2. When the state register M0 is set to 2 at the first function selection screen, the control unit 10 proceeds to step S114. Otherwise, the control unit 10 proceeds to step S104. In step S104, the control unit 10 determines whether the state register M0 is set to 1. If the state register M0 is set to 1 in the mode selection mode, the control unit 10 proceeds to step S112. Otherwise, the control unit proceeds to step S105. In step S105, the control unit 10 determines if the mode register M1 is set to 10. If the mode register M1 is set to 10 in the manual mode M, the control unit 10 proceeds to step S106. Otherwise, the control unit 10 proceeds to step S107.

In step S106, the display setting of the execution screen in the manual mode M is performed. The shutter priority value TV and the aperture priority value AV that are set are displayed by setting the command data D0–D7 to the corresponding pattern generator memory addresses for the appropriate characters. For example, when F 5.6 of 2000 is set, the pattern generator memory address values "42", "0A", "4A", "0A", "26", "05", "16" and "20" are set into the command data D0–D7. In the manual mode M, the shutter priority value TV and the aperture priority value AV can be set. Therefore, bits 0–5 of the command data D10 are set to the binary number "011011", and the triangle segments of the auxiliary segment display component 34$f$, 34$e$, 34$c$ and 34$b$ are appropriately displayed.

In step S107, the control unit 10 determines whether the mode register M1 is set to 8. If the memory register M1 is set to 8 in the shutter priority mode S, the control unit 10 proceeds to step S108. Otherwise, the control unit 10 proceeds to step S109.

In step S108, the execution screen for the shutter priority mode S is displayed. The shutter priority value TV that is set is displayed by putting the corresponding character addresses into the command data D0–D3. For example, when 2000 is set, in accordance with FIG. 7, the address values "42", "0A", "4A" and "0A" are set into the command data D0–D3. In addition, the shutter priority mode S is capable of setting the shutter priority value TV. Thus, bits 0–5 of the command data D10 are set to the binary number, "011000" to display the appropriate triangle segments of the auxiliary segment display components 34$b$ and 34$c$.

In step S109, the control unit 10 determines whether the mode register M1 is set to 9. If the mode register M1 is set to 9 (the aperture priority mode A), the control unit 10 proceeds to step S110. Otherwise, the control unit 10 proceeds to step S111.

In step S110, the set aperture priority value AV is displayed by putting the corresponding character addresses into the command data D4–D7. For example, when F 5.6 is set, the address values "26", "05", "16" and "20" are set into the command data D4–D7. In addition, in the aperture priority mode A, the setting of the aperture priority value AV is performed. Therefore, bits 0∝5 of D10 are set to the binary number "000011" to display the appropriate triangle segments of the auxiliary segment display components 34$f$ and 34$e$.

In step S111, to display the icons corresponding to the stored mode in the mode register M1 on the dot matrix display units 31$a$ and 31$b$ of the dot matrix display component 310, the corresponding icon addresses shown in Table 8 are set into D0 and D1. In addition, program modes

TABLE 8

| M1 | Mode register | D0 | D1 |
|---|---|---|---|
| 0 | P0: Automatic mode | "80" | "81" |
| 1 | P1: Scenery mode | "82" | "83" |
| 2 | P2: Portrait mode | "84" | "85" |
| 3 | P3: Close up mode | "86" | "87" |
| 4 | P4: Sports mode | "88" | "89" |
| 5 | P5: Night view | "8C" | "8D" |
| 6 | P6: Silhouette mode | "8E" | "8F" |
| 7 | P7: Inspiration mode | "8A" | "8B" |

P0–P7 do not provide the ability to set shutter priority value TV or aperture priority value AV. Therefore, bits 0–5 of command data D10 are set to the binary number "000000" so that no triangle segments of the auxiliary segment display component 34 are displayed. However, program shift can be set during the automatic mode under the advanced mode. For this case bits 0–5 of D10 are set to the binary number "000011" so that the appropriate triangle segments of the auxiliary segment display components 34$e$ and 34$f$ are displayed.

In step S112, the switch SW0 is checked. In advanced mode, the control unit 10 proceeds to step S122. In the simple mode, the control unit 10 proceeds to step S113. In step S113, the dot matrix display unit 31$a$–31$h$ displays the icons corresponding to the automatic mode, the scenery mode, the portrait mode and the close up mode in accordance with Table 8. The addresses "80"–"87" are set into the command data D0–D7. To indicate the ability to select one of the four modes, the triangle segments 34a, 34c, 34d and 34f are flashed by setting bits 0–5 of the command data D10 to the binary number "101101" and setting the flashing flag for each triangle segment 34a, 34c, 34d and 34f.

Table 9 shows the numerical address values to be set into the command data D0–D7 to display the screen register M2 contents in the mode selection mode or the function selection mode under the advanced mode. The display process is performed by steps S114 through S128.

D10 to the binary number "10011" and setting the flashing flag for the triangle segments 34a, 34e and 34f.

When the film is a DX film, the display is used only for confirmation. Therefore, the triangle segment 34a is flashed to indicate the completion of the setting operation. The triangle segment 34a is flashed by setting bits 0–5 of the command data D10 to the binary number "100001". The flashing flag for the triangle segment 34a is also set.

TABLE 9

| M2 | Display screen | D0 | D1 | D2 | D3 | D4 | D5 | D6 | D7 |
|---|---|---|---|---|---|---|---|---|---|
| 0 | Mode selection first | "90" | "91" | "92" | "93" | "94" | "95" | "96" | "97" |
| 1 | P0–P2 selection | "80" | "81" | "82" | "83" | "84" | "85" | "A2" | "A3" |
| 2 | P3 & P4 selection | "A0" | "A1" | "86" | "87" | "88" | "89" | "A2" | "A3" |
| 3 | P5–P7 selection | "A0" | "A1" | "8E" | "8F" | "8C" | "8D" | "8A" | "8B" |
| 4 | Function first | "98" "9A" | "99" "9B" | "CE" | "CF" | "9C" | "9D" | "9E" | "9F" |
| 5 | AF mode setting | "CE" | "CF" | "20" | "20" | "AC" | "AD" | "AE" | "AF" |
| 6 | Film sensitivity setting | "9C" | "9D" | "A4" "A6" | "A5" "A7" | Set according to AV | | | |
| 7 | Exposure adjustment setting | 9 E | 9 F | 20 | 20 | Set according to DSV | | | |

In step S114, the control unit 10 determines whether the screen register M2 is 7. If the screen register M2 is at 7, and the exposure adjustment setting screen is displayed, the control unit 10 proceeds to step S115. Otherwise, the control unit 10 proceeds to step S116. In step S115, the display data of the exposure adjustment setting screen (M2=7 row of Table 9) is prepared by setting address values "9E" and "9F" into command data D0 and D1 to display "±" on display block 311. The command data D2 and D3 are set to address value "20" in step S101 during initialization and will remain at this value to display blanks. The command data D4–D7 are set corresponding to the adjustment quantity based on the adjustment for DSV. If the adjustment quantity is ±0, the display of "±0.0" is generated by setting the addresses "66" "0A" "60" and "0A" to the command data D4–D7 to display "±0.0" on display blocks 313 and 314. Triangle segment 34e is flashed to indicate the DSV down setting, triangle segment 34f is flashed to indicate the DSV up setting, and triangle segment 34a is flashed to indicate the completion of the exposure adjustment setting operation by setting bits 0–5 of D10 to the binary number "110001" and setting the flashing flags of the triangle segments 34a, 34e and 34f.

In step S116, the control unit 10 determines whether the screen register M2 is 6. If the screen register M2 is at 6, the film sensitivity setting screen is displayed, and the control unit 10 proceeds to step S117. Otherwise, the control unit 10 proceeds to step S118. In step S117, the display data for the film sensitivity setting screen (M2=row 6 of Table 9) is prepared by setting address values "9C" and "9D" into D0 and D1. If the film is a DX film, "A4" and "A5" are set into command data D2 and D3 to display "DX" on display block 312. If the film is not DX film, then "A6" and "A7" are set into D2 and D3 to display "MSET" on display block 312. The command data D4–D7 are set corresponding to the film sensitivity SV for the DX value or the manual setting. When the film sensitivity SV is 400, the address values "20" , "04" "0A" , and "0A" are set to D4–D7, respectively. If the film is not a DX film, the triangle segments 34e and 34f is flashed to indicate the film sensitivity SV down and up settings, respectively, and the triangle segment 34a is flashed to indicate the completion of the setting operation. The triangle segments 34a, 34e and 34f are flashed by setting bits 0–5 of In step S118, the control unit 10 determines whether the screen register M2 is 5. If the screen register M2 is set to 5, the AF mode setting screen is displayed and the control unit 10 proceeds to step S119. Otherwise, the control unit 10 proceeds to step S120.

In step S119, the display data of AF mode setting (M2= row 5 of Table 9) is prepared by setting addresses "CE" and "CF" into the command data D0 and D1 to display "AF" on display block 311. The command data D2 and D3 were set to the address value "20" during the initialization step S101. The command data D2 and D3 will remain at this value to display blanks in display block 312. Address values "AC", "AD", "AE" and "AF" are set into command data D4–D7 for an em display of "S" and "C" in display blocks 313 and 314. The triangle segments 34d and 34f are flashed to indicate the setting operation of "S" or "C". Bits 0–5 of the command data D10 are set to the binary number "000001", and the corresponding flashing flags are set.

In step S120, the control unit 10 determines whether the screen register M2 is 4. If the screen register M2 is set to 4, the first function selection screen is displayed, and the control unit 10 proceeds to step S121. Otherwise, the control unit 10 proceeds to step S122.

In step S121, the display data of the first function selection screen (M2=4 row of Table 9) is prepared. If a desirable mode has not been set, then address values "98" and "99" are set into command data D0 and D1 as part of the display screen AM16 for setting the desired mode. If a desirable mode is set, "9A" and "9B" are set into the command data D0–D1 as part of the display screen AM17 for clearing all mode settings. The command data D2–D7 are set to address values "CE", "CF", "9C", "9D", "9E" and "9F", respectively to display "AF," "ISO" and "+/–" on display blocks 312–314 indicating that one of the four functions above should be selected. The triangle segments 34a, 34c, 34d and 34f are flashed, and bits 0–5 of the command data D10 are set to the binary number "101101", and the corresponding flashing flags are set.

In step S122, the control unit 10 determines whether the screen register M2 is 0. If screen register M2 is set to 0 and the first mode selection screen is displayed, the control unit 10 proceeds to step S123. Otherwise, the control unit 10 proceeds to step S124.

In step S123, the display data of the first mode selection screen (M2=row 0 of Table 9) is prepared by setting the command data D0–D7 to the address values "90"–"97" for displaying "P", "S", "A" and "M" in display blocks 311–314. The triangle segment displays 34a, 34c, 34d and 34f are flashed to indicate that one of the above four functions should be selected. Bits 0–5 of the command data D10 are set to the binary number "101101", and the corresponding flashing flags are set.

In step S124, the control unit 10 determines whether the screen register M2 is 1. If the screen register M2 is 1 and the program modes P0 through P2 selection screen is displayed, the control unit 10 proceeds to step S125. Otherwise, the control unit 10 proceeds to step S126.

In step S125, the display data of the program modes P0 through P2 selection display screen (M2=row 1 of Table 9) is prepared by setting the command data D0–D7 to the address values "80–85", "A2" and "A3", respectively. This generates the display screen AM3 of FIG. 17 corresponding to the program modes P0 through P2 and the right arrow mark on display blocks 311–314. Display block 314 displays the right arrow mark and the display screen AM3 is changed to display screen AM7 by pushing the switch SW4. The triangle segment displays 34a, 34c, 34d and 34f are flashed to indicate that one of the above four functions should be selected. Bits 0–5 of the command data D10 are set to the binary number "101101", and the corresponding flashing flags are set.

In step S126, the control unit 10 determines whether the screen register M2 is 2. If the screen register M2 is 2 and the program modes P3 and P4 selection screen is displayed, the control unit 10 proceeds to step S127. Otherwise, the screen register M2 is set to 3, and the control unit 10 proceeds to step S128.

In step S127, the display data of the program modes P3 and P4 selection screen (M2=row 2 of Table 9) is prepared by setting the command data D0–D7 to the address values "A0", "AI", "86"–"89", "A2" and "A3", respectively. This generates the display screen AM7 of FIG. 17 corresponding to program modes P3 and P4 and the right and left arrow mark. Pushing the switches SW3 or SW4 corresponding to the right and left arrow mark changes the display screen AM7 to display screens AM8 and AM31, respectively. The triangle segments 34a, 34c, 34d and 34f are flashed to indicate that one of the above four functions should be selected. Bits 0–5 of the command data D10 are set to the binary number "101101" and the corresponding flashing flags are set.

In step S128, (M2=row 3 of Table 9) the display data of the program modes P5 through P7 selection screen AM8 is prepared by setting the command data D0–D7 to the address values "A0", "AI", "8E", "8F", "8C", "8D", "8A" and "8B", respectively. By operating the switch SW3 corresponding to the left arrow mark, the display screen AM8 is changed to the display screen AM7, displaying the selection screens for other modes. The triangle segment displays 34a, 34c, 34d and 34f are flashed to indicate that one of the above four functions should be selected. Bits 0–5 of the command data D10 are set to the binary number "101101", and the corresponding flashing flags are set.

In step S129, the frame number data is prepared by setting the command data D8 and D9 for example, to display the frame number "24", the command data D8 is set to the binary number "1100110", and the triangle segments 32g, 32f, 32c and 32b are flashed. The command data to D9 is set to the binary number "1011011", and the flashing flags for the triangle segments 33g, 33e, 33d, 33b and 33a are set.

In step S130, the command data D0 through D11 that were set in steps S101–S129 are transferred to the LCD driver 20 to generate the display on the display panel 30. When the segment display components 34a–34f are set to flash, a one second cycle of flash display is generated by alternating the bits 0–5 of the command data D10 between 0 and 1 for every 0.5 second.

When a DX film is loaded into the camera, the DX film is read in the DX mode. For the advanced mode, the film sensitivity value cannot be set, however, the film sensitivity can be confirmed by the film sensitivity setting screen AM19 of the function selection mode. The film sensitivity numerical value cannot be confirmed in the simple mode.

When a film is loaded, the back cover is closed, and if the film is not a DX film, the DX mode is ended, and the film sensitivity setting screen AM20 is displayed. The display screen AM20 allows the film sensitivity to be manually set. When the setting operation is completed, the DX warning state is reset. The DX warning state is ON even when the power source is cut off. Thus, the film sensitivity setting screen AM20 is displayed until the film setting operation is completed. In addition, as shown in FIG. 11, if the back cover is opened, the DX warning is not issued because the film is being exchanged, and the DX warning state is reset. When this occurs, the film setting screen AM20 is replaced with the initial display screen SM1 or AM1.

Four display blocks 311–314 are positioned in the display panel 30, and in the first display, icons expressing each of the modes are displayed in a row. Accordingly, because the selection choices are arranged in a single row, it is easy for even a photographer unfamiliar with the camera to recognize the selection choices. In addition, because the switches SW3–SW6 are arranged in correspondence to display blocks 311–314, the photographer can know with certainty the switch that is to be used in making a selection, even if the photographer is unfamiliar with the process. Moreover, because icons that are displayed in dot displays are used, it is possible for the photographer to immediately determine the contents.

In addition, in the first display in the simple mode, mode selection is confirmed by selecting one of the switches SW3–SW6. That is to say, camera parameters are input into the camera by selecting one of the items out of the selection choices. When an item is selected, the display shifts to a second display. This second display displays only the icon for the selected mode. Accordingly, it is possible for the photographer to verify the selected state.

Furthermore, it is possible to return to the first display from the second display by pressing switch SW2. Accordingly, it is possible for the photographer to always return to the original display.

Moreover, by continuously depressing the switch SW2 for a fixed length of time, the photographer can change to the automatic mode or alternatively, to a predetermined mode. A special mode memory may be separately provided, for example, and when the switch SW2 is depressed for longer than this fixed length of time, a mode would be selected in accordance with the contents of this special memory instead of the automatic mode.

A menu screen for mode selection and a menu screen for function setting are prepared in the process of the first display in the advanced mode. The mode selection menu screen is displayed with priority, and when the mode selection menu screen is displayed and a change operation is received through the described change operation unit, it is possible to conduct a process wherein the first display is changed to the function setting menu screen. Setting of the film sensitivity is included in this function setting menu.

Furthermore, in the present invention, the time allowed for selecting the mode in the first display is set longer than the time allowed for setting parameters in the second display. By doing this, enough time can be provided for a photographer unfamiliar with the camera to make the needed decisions for selecting the mode. However, because less time is required to set the parameters for a selected mode, less time is allowed for setting parameters in the second display, thereby saving energy.

With the described embodiments, a liquid crystal display is used as the dot matrix display component, but this is intended to be illustrative and not limiting. Similarly, another element could be used as long as the element is a display element capable of dot matrix display.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera, comprising:
   a display device displaying a plurality of display-screens, each of the plurality of display-screens being one of a first display and a second display;
   an input device inputting data in accordance with each of the plurality of display-screens displayed by the display device; and
   a control unit coupled to the display device and the input device, wherein the control unit sets a specified timer value for each of the plurality of display-screens displayed by the display device and stops receiving data from the input device when a timer generates a time-out signal based on the specified timer value.

2. The camera of claim 1, wherein the display device is a display panel comprising:
   a plurality of display blocks displaying alphanumeric characters and icons;
   a plurality of display segments displaying symbols, wherein each display segment corresponds to one of the plurality of display blocks; and
   a display driver receiving command data from the control unit and driving the display panel based on the received command data.

3. The camera of claim 2, wherein the input device comprises a plurality of ON-OFF switches, one of the plurality of ON-OFF switches corresponding to one of the plurality of display blocks, the input device generating a plurality of switch signals, one switch signal corresponding to one of the plurality of ON-OFF switches.

4. The camera of claim 3, wherein the camera has at least a simple mode and an advanced mode, at least one mode switch of the plurality of ON-OFF switches selecting one of the at least the simple and advanced modes.

5. The camera of claim 4, wherein the control unit sends a simple command data to the display driver for displaying a simple first display-screen corresponding to the simple mode and an advanced command data to the display driver for displaying an advanced first display-screen corresponding to the advanced mode.

6. The camera of claim 5, wherein:
   one of the simple and advanced first display-screen displays a plurality of camera sub-modes, the first display-screen being displayed on the plurality of display blocks of the display device, one of the displayed plurality of camera sub-modes corresponding to one of the plurality of ON-OFF switches so that one ON-OFF switch corresponds to one sub-mode; and
   when one of the plurality of ON-OFF switches is pushed, the control unit responds by inputting the corresponding switch signal generated by the input device as the selection of the corresponding sub-mode and by sending the command data to the display driver to display one of a simple second display and an advanced second display.

7. The camera of claim 6, wherein the simple second display corresponds to the selected sub-mode and, when a menu switch of the plurality of ON-OFF switches is pushed, the control unit re-displays the simple first display.

8. The camera of claim 6, wherein the advanced second display corresponds to the selected sub-mode and, when a menu switch of the plurality of ON-OFF switches is pushed, the control unit re-displays the advanced first display.

9. The camera of claim 6, wherein the advanced second display is comprised of a plurality of second display display-screens, each of the plurality of the second display display-screens allowing the selection of picture taking parameters corresponding to one of a plurality of camera devices.

10. The camera of claim 3, wherein the control unit sends the command data to the display driver to display the alphanumeric characters, the icons, and the symbols corresponding to one of the first and second displays, the control unit setting the specified timer value of the timer to a first timer value corresponding to the first display and a second timer value corresponding to the second display.

11. The camera of claim 10, wherein the control unit resets the specified timer value of the timer to one of the first and second timer values when one of the ON-OFF switches of the input device is switched to ON.

12. The camera of claim 10, wherein the first timer value is longer than the second timer value.

13. The camera of claim 10, wherein the first timer value is 60 seconds and the second timer value is eight seconds.

14. The camera of claim 1, wherein the camera further comprises a power supply circuit coupled to the control unit, the power supply circuit setting the camera to one of a full power state and a stand-by power state, the camera in the stand-by power state consuming less power than when in the full power state, the control unit commanding the power supply circuit to set the camera in the stand-by power state when the timer generates a time-out signal so that camera power is saved.

15. The camera of claim 14, wherein when the camera is in the full power state, the display device is turned on and the control unit receives data from the input device.

16. The camera of claim 14, wherein when the camera is in the stand-by state, the display device is turned off and the control unit stops receiving data from the input device.

17. The camera of claim 1, wherein the control unit sets the specified timer value of the timer to a first timer value corresponding to the first display and a second timer value corresponding to the second display.

18. The camera of claim 17, wherein the first timer value is longer than the second timer value.

19. A method of displaying and inputting data for a camera, comprising the steps of:
   putting the camera in a full power state;

setting the camera to one of a simple mode and an advanced mode;

displaying a display-screen corresponding to a first display in accordance with one of the simple and advanced modes;

resetting the timer; and setting a specified timer value to a first timer value, the timer generating a time-out signal when the timer expires based on the specified timer value.

20. The method of claim 19, further comprising the steps of:

setting the camera into a stand-by mode when the timer expires before an input is received from the input device.

21. The method of claim 19, further comprising the steps of:

selecting a camera sub-mode by inputting data through an input device;

receiving the camera sub-mode selection from the input device when the time-out signal is not generated;

displaying a display-screen corresponding to a second display in accordance with one of the simple and advanced modes;

resetting the timer; and setting a specified timer value to a second timer value, the second timer value being shorter than the first timer value.

22. The method of claim 21, further comprising the steps of:

setting the camera into a stand-by mode when the timer expires before an input is received from the input device.

23. The method of claim 21, further comprising the steps of:

inputting data using the input device to one of verifying the selected camera sub-mode when in the simple mode and setting picture taking parameters when in the advanced mode; and receiving one of verification and parameter setting data from the input device when the time-out signal is not generated.

24. The method of claim 19, further comprising the step of re-displaying the first display when a menu switch is pushed.

25. A camera, comprising:

display means for displaying a plurality of display-screens, each of the plurality of display-screens being one of a first display and a second display;

input means for entering data in accordance with each of the plurality of display-screens displayed by the display means; and control means coupled to the display means and the input means for controlling the display means, wherein the control means sets a specified timer value for each of the plurality of display-screens displayed by the display means and wherein the control means stops receiving data from the input means when a timer generates a time-out signal.

26. The camera of claim 25, wherein the control means sets the specified timer value of the timer to a first timer value corresponding to the first display and a second timer value corresponding to the second display.

27. The camera of claim 25, wherein the first timer value is longer than the second timer value.

28. A camera, comprising:

a display device displaying a plurality of display-screens in accordance with one of a camera sub-mode selection and a picture taking parameter setting;

an input device inputting data corresponding to each of the plurality of display-screens;

a control unit coupled to the display device and the input device, wherein the control unit sends command data to the display device to display stored camera sub-mode and picture taking selection choices, the control unit setting a specified timer value for each of the plurality of display-screens allowing a specified time for the input device to make one of the camera sub-mode choices and picture taking parameter changes, the control unit stops receiving data from the input device when a timer generates a time-out signal based on the specified timer value.

* * * * *